US012731925B2

(12) United States Patent
Jiang

(10) Patent No.: US 12,731,925 B2
(45) Date of Patent: Sep. 8, 2026

(54) FLOATING-TYPE CONNECTOR AND CONNECTOR ASSEMBLY

(71) Applicant: Tyco Electronics Japan G.K., Kawasaki (JP)

(72) Inventor: Ming Jiang, Kawasaki (JP)

(73) Assignee: TE CONNECTIVITY JAPAN G.K., Kawasaki (JP)

( * ) Notice: Subject to any disclaimer, the term of this patent is extended or adjusted under 35 U.S.C. 154(b) by 343 days.

(21) Appl. No.: 18/531,193

(22) Filed: Dec. 6, 2023

(65) Prior Publication Data

US 2024/0186732 A1 Jun. 6, 2024

(30) Foreign Application Priority Data

Dec. 6, 2022 (JP) ................................ 2022-194863

(51) Int. Cl.
*H01R 12/71* (2011.01)
*H01R 13/506* (2006.01)
*H01R 13/631* (2006.01)

(52) U.S. Cl.
CPC ......... *H01R 12/716* (2013.01); *H01R 13/506* (2013.01); *H01R 13/631* (2013.01)

(58) Field of Classification Search
CPC ... H01R 12/716; H01R 12/91; H01R 13/6315
USPC ....................................... 439/74, 541.5, 247
See application file for complete search history.

(56) References Cited

U.S. PATENT DOCUMENTS 7,354,279 B2 * 4/2008 Uesaka .................. H01R 13/41 439/74
8,257,095 B2 9/2012 Akai et al.
10,615,528 B2 * 4/2020 Suzuki ............... H01R 12/7005
10,651,599 B2 * 5/2020 Hashiguchi ............ H01R 13/11
11,431,119 B2 * 8/2022 Obata .................... H01R 12/91
11,552,419 B2 * 1/2023 Obata .................... H01R 12/91
11,626,676 B2 * 4/2023 Kobayashi ............. H01R 43/16 439/74
2020/0412038 A1 * 12/2020 Yoshida ............. H01R 13/6581
2021/0376510 A1 * 12/2021 Obata ................ H01R 13/6597
2022/0069493 A1 * 3/2022 Kobayashi ......... H01R 12/7005
2023/0318226 A1 10/2023 Xu et al.

(Continued)

FOREIGN PATENT DOCUMENTS

| | | | |
|---|---|---|---|
| CN | 113346285 | A | 9/2021 |
| EP | 3694056 | A1 | 8/2020 |
| EP | 4068525 | A1 | 10/2022 |

OTHER PUBLICATIONS

Extended European Search Report dated Apr. 30, 2024, corresponding to Application No. 23214555.7-1201, 10 pages.

*Primary Examiner* — Hae Moon Hyeon

(57) ABSTRACT

A connector comprises a plurality of contacts, a stationary housing, and a movable housing. The plurality of contacts are arranged along a predetermined first to form a first row and a second row in parallel, positioned on a reference surface encompassing the first direction and a second direction orthogonal to the first direction, and are bonded to an object to be bonded. The stationary housing surrounds the plurality of contacts and positioned on the reference surface. The movable housing sections an interior of the stationary housing into an area closer to the first row and an area closer to the second row, and is displaceable in the first direction and the second direction with respect to the stationary housing.

20 Claims, 16 Drawing Sheets

(56) References Cited

U.S. PATENT DOCUMENTS

| | | | | |
|---|---|---|---|---|
| 2024/0186736 | A1* | 6/2024 | Jiang | H01R 13/424 |
| 2024/0186740 | A1* | 6/2024 | Jiang | H01R 12/91 |
| 2025/0096504 | A1* | 3/2025 | Chen | H01R 13/02 |

* cited by examiner

FLOATING-TYPE CONNECTOR AND CONNECTOR ASSEMBLY

CROSS-REFERENCE TO RELATED APPLICATION

This application claims the benefit of Japanese Patent Application No. 2022-194863 filed on Dec. 6, 2022, the whole disclosure of which is incorporated herein by reference.

FIELD OF THE INVENTION

The present invention relates to a contact, a connector including the contact, and a connector assembly including the connector.

BACKGROUND

So-called floating-type connector assemblies can be used for mechanical and electrical connections between components included in various electronic instruments. Such a connector assembly includes, for example, a first connector including a contact that is bonded to a first circuit board and a second connector including a contact that is bonded to a second circuit board.

In order to prevent a hindrance to assembly of the first circuit board and the second circuit board due to the tolerance of a dimension and a shape, working, or assembly, and to achieve stable connection in the case of vibrations, the first connector and the second connector are configured so that elastic deformation of the contacts enables the first connector and the second connector to mate with each other even if the positions of the first connector and the second connector relatively deviate from each other in a predetermined floating range.

A socket connector of the prior art includes a bottom shell, a top shell that is introduced from above the bottom shell into the interior of the bottom shell, and a plurality of socket contacts that are retained by the bottom shell and the top shell, and mates with a plug connector. Each of the socket contacts is molded to have a shape including a plurality of bends, and is retained by the bottom shell and the top shell. The top shell is assembled with the bottom shell by engaging with fittings. When the top shell comes into contact with the housing of the plug connector and is guided along a slope, the socket contacts are elastically deformed according to the position of the contact of the plug connector.

Increases in floating ranges in connectors are demanded against the backdrops of the difficulty of management of tolerance, resulting from the complexity of the structures of electronic instruments, and the allowing of contact pitches to be fine.

However, the top and bottom shells of the prior art connector are pressed down against the circuit boards by the fittings that fit the top and bottom shells. Therefore, even if slight relative displacement is possible, the floating range which is the tolerance zone of the relative displacement is insufficient for the demand. Moreover, the fittings that fit the top shell and the bottom shell to each other are needed.

SUMMARY

According to an embodiment of the present disclosure, a connector comprises a plurality of contacts, a stationary housing, and a movable housing. The plurality of contacts are arranged along a predetermined first to form a first row and a second row in parallel, positioned on a reference surface encompassing the first direction and a second direction orthogonal to the first direction, and are bonded to an object to be bonded. The stationary housing surrounds the plurality of contacts and positioned on the reference surface. The movable housing sections an interior of the stationary housing into an area closer to the first row and an area closer to the second row, and is displaceable in the first direction and the second direction with respect to the stationary housing.

BRIEF DESCRIPTION OF THE DRAWINGS

The invention will now be described by way of example with reference to the accompanying Figures, of which:

FIG. 1(*b*) is a cross sectional view taken along the line Ib-Ib of section (a).

FIG. 2(*b*) is a cross sectional view taken along the line IIb-IIb of FIG. 2(*a*).

FIG. 5(*b*) is a partially enlarged front view of a guide projection.

FIG. 5(*c*) is a partially enlarged side view of the guide projection.

FIG. 8(*b*) is an isometric view of the first contact, and FIG. 8(*c*) is a front view of the first contact.

FIG. 11(*b*) is a transverse cross sectional view of FIG. 11(*a*).

DETAILED DESCRIPTION OF THE EMBODIMENTS

Figure 1A:
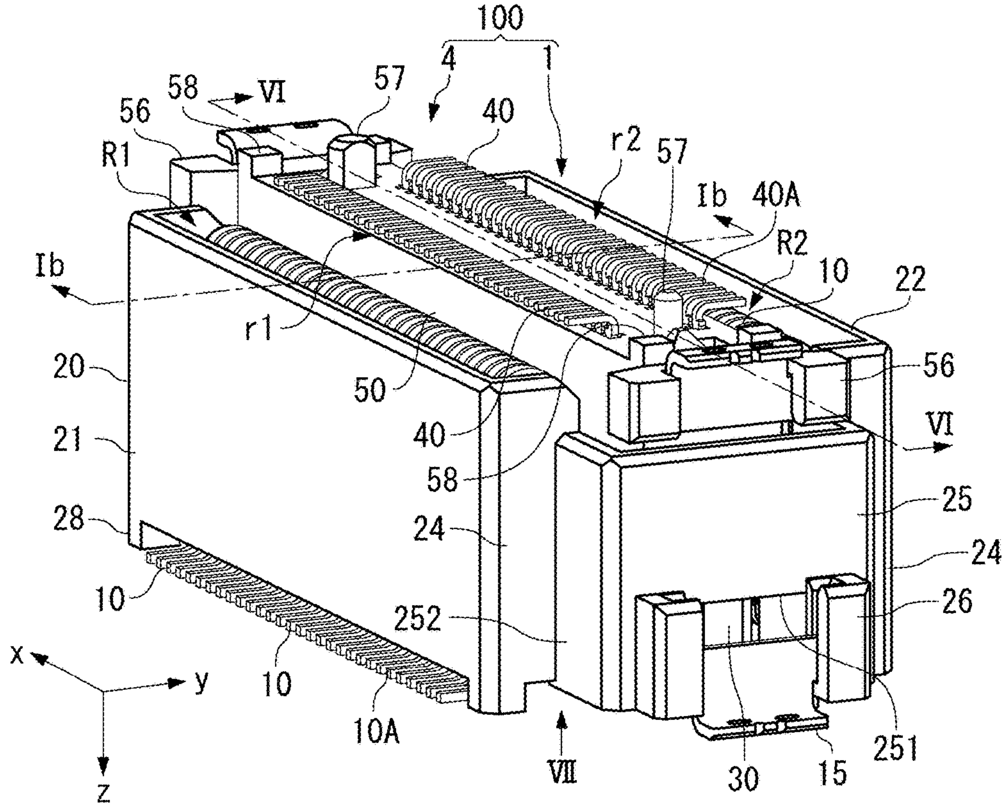
FIG. 1(*a*) is an isometric view illustrating a connector assembly according to an embodiment of the invention. The connector assembly includes a first connector and a second connector.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

[Overall Configuration]

Figure 1B:
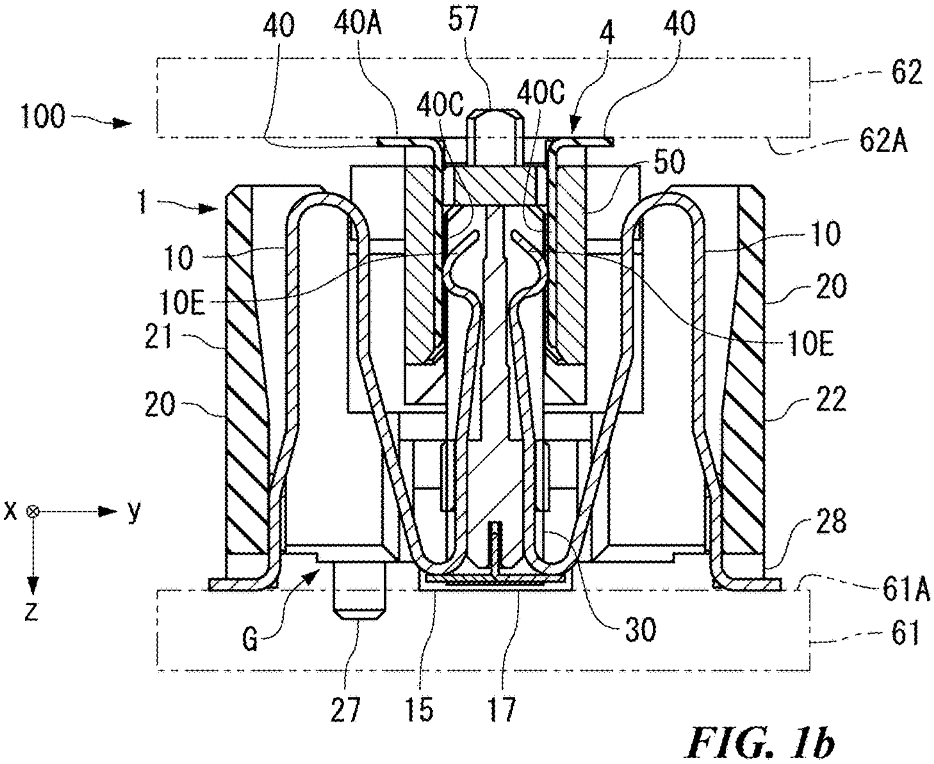

A connector assembly 100 illustrated in FIGS. 1(*a*) and 1(*b*) includes a first connector 1 and a second connector 4 that are mated with each other, and is used for mechanical and electric connections between circuit boards included in various electronic instruments. First, the schematic configurations of the first connector 1 and the second connector 4 are described. The first connector 1 includes: a plurality of first contacts 10; and a stationary housing 20 and a movable housing 30 that retain the plurality of first contacts 10. The plurality of first contacts 10 are bonded to a first circuit board 61 as an object to be bonded. The first contacts 10 are positioned along a predetermined first direction x to form a first row R1 and a second row R2 in parallel, and positioned on a first mounting surface 61A of the first circuit board 61.

The second connector 4 incudes: a plurality of second contacts 40; and a housing 50 that retains the plurality of second contacts 40. The plurality of second contacts 40 are bonded to a second circuit board 62. Like the first contacts 10, the second contacts 40 are positioned to form a first row r1 and a second row r2 in parallel, and positioned on a second mounting surface 62A of the second circuit board 62. When the first connector 1 and the second connector 4 are mated with each other, the first contacts 10 in the first row R1 are electrically connected to the second contacts 40 in the first row r1, respectively, and the first contacts 10 in the second row R2 are electrically connected to the second contacts 40 in the second row r2, respectively.

The first connector 1 and the second connector 4 are mated with each other in a mating direction z orthogonal to the first mounting surface 61A and the second mounting surface 62A in a state in which the first circuit board 61 and the second circuit board 62 are positioned in parallel. The first mounting surface 61A includes the first direction x and a second direction y orthogonal to the first direction x and the mating direction z. The same applies to the second mounting surface 62A.

In the present specification, an area closer to the first circuit board 61 in the mating direction z is referred to as a lower area, and an area farther from the first circuit board 61 in the mating direction z is referred to as an upper area. The first connector 1 of the present embodiment permits relative displacement between the first circuit board 61 and the second circuit board 62 over a floating range depending on the dimensions of gaps set in the first direction x and the second direction y, respectively, between the stationary housing 20 and the movable housing 30, as described later.

[Configuration of First Connector]

Figure 2A:
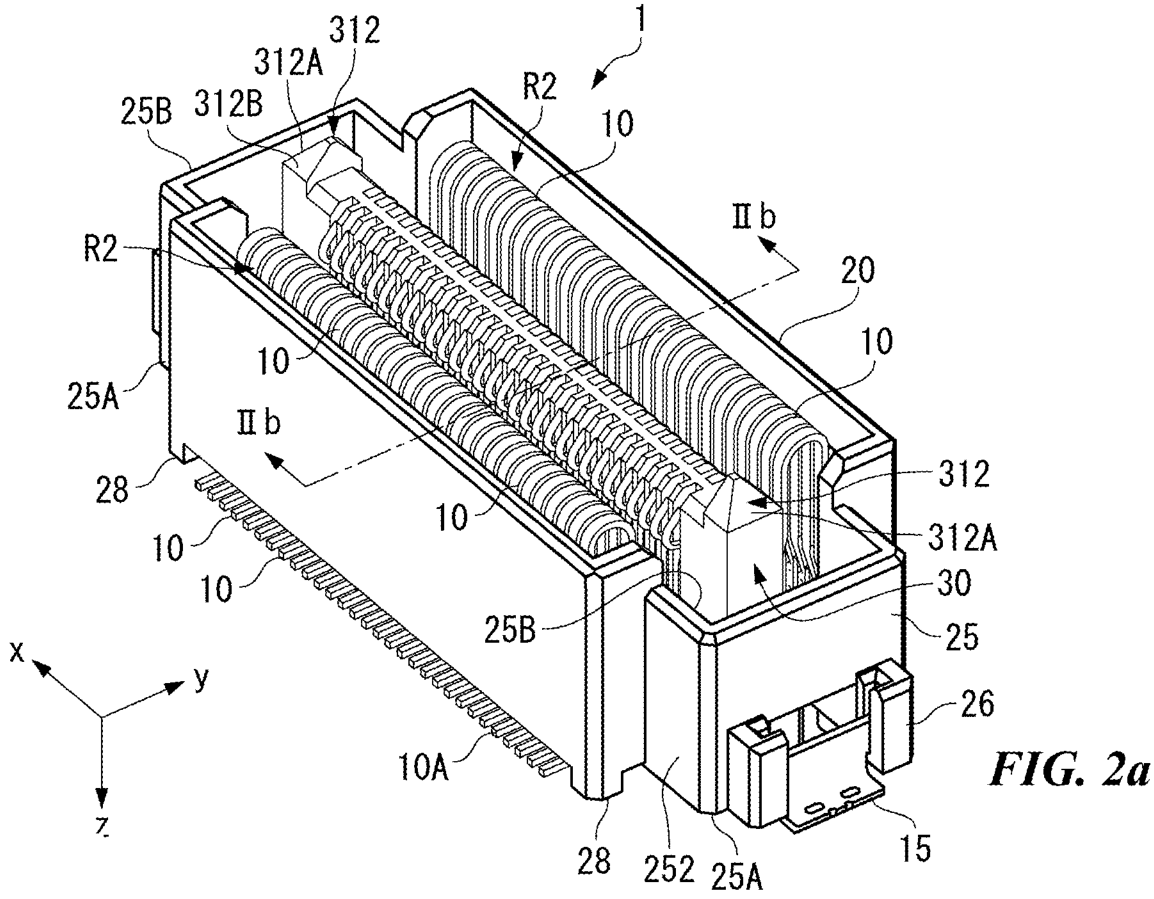
FIG. 2(*a*) is an isometric view illustrating the first connector.
Figure 2B:
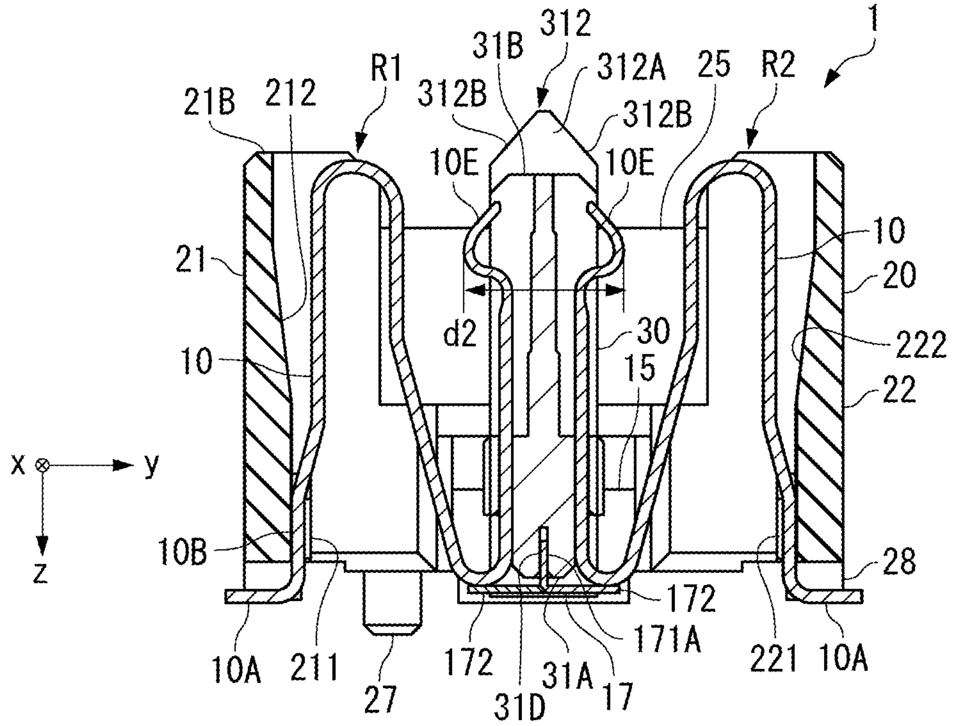

As illustrated in FIGS. 2(*a*), 2(*b*), and 3, the first connector 1 includes the plurality of first contacts 10, the stationary housing 20, and the movable housing 30 that is positioned so as to be able to be relatively displaced with respect to the stationary housing 20. The first connector 1 preferably includes: housing bonding elements 15 that allow the stationary housing 20 to be bonded to the first circuit board 61; and a ground contact connection element 17 (FIG. 9) that comes into contact with some of the contacts 10. In some drawings, illustration of the ground contact connection element 17 is omitted.

The first contacts 10 in the first row R1 and the first contacts 10 in the second row R2 are each positioned at an equal pitch in the first direction x, and positioned adjacently to each other in the second direction y. In the present embodiment, the positions, in the first direction x, of the first contacts 10 in the first row R1 and the first contacts 10 in the second row R2 are arranged to correspond to each other. Without limitation thereto, the first contacts 10 in the first row R1 and the first contacts 10 in the second row R2 may be arranged to be shifted in the first direction x by the dimension half the pitch. The stationary housing 20 is integrally formed by injection molding using an insulating resin material. The same applies to the movable housing 30.

(Stationary Housing)

Figure 4:
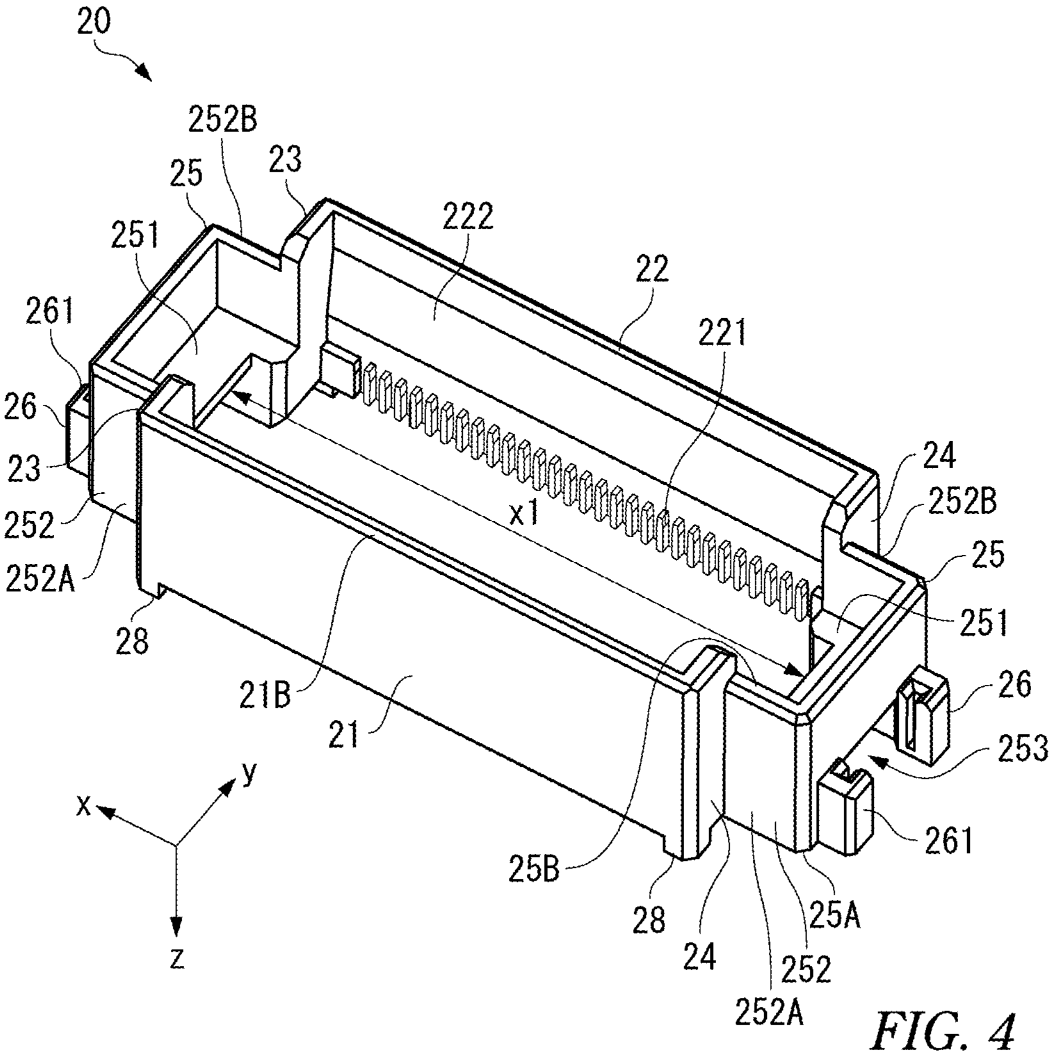
FIG. 4 is an isometric view illustrating the stationary housing of the first connector.

As illustrated in FIG. 4, the stationary housing 20 includes: side walls 21 and 22 and partial walls 23 and 24 that surround the plurality of first contacts 10, and are positioned on the first mounting surface 61A; expansion walls 25 that protrude outside the partial walls 23 and 24 in the first direction x, and are formed on both sides of the stationary housing 20 in the first direction x; bonding element retention portions 26 that retain the housing bonding elements 15; bosses 27 for location that are introduced into holes that are opened in the first circuit board 61 and are not illustrated; and legs 28 that are positioned on the first mounting surface 61A. Illustration of the bosses 27 is omitted in some drawings.

The side walls 21 and 22 extend in the first direction x in which the first contacts 10 are arranged. The side walls 21 and 22 face each other in the second direction y. The partial walls 23 and 24 orthogonal to the side walls 21 and 22 are positioned on both sides in the second direction y between the side walls 21 and 22, and are contiguous to the expansion walls 25. A space in which the first contacts 10 are positioned and which is rectangular in planar view is formed in an inner area surrounded by the walls 21 to 24. The legs 28 are formed on the lower end of four corners formed by the walls 21 to 24.

The side walls 21 and 22 and the partial walls 23 and 24 stand up on the mounting surface 61A from the lower end of each thereof (for example, 21A) to an upper end that is slightly higher than the first contacts 10 (for example, 21B). Gaps G (FIG. 1(*b*)) are formed between the first mounting surface 61A and the lower ends of the walls 21 to 24.

Retention grooves 211 into which the first contacts 10 in the first row R1 are press-fitted are formed at the same pitch as that of the first contacts 10 in the vicinity of the lower end of the inner side of the side wall 21. Likewise, retention grooves 221 into which the first contacts 10 in the second row R2 are press-fitted are formed at the same pitch as that of the first contacts 10 in the vicinity of the lower end of the inner side of the side wall 22.

A chamfer 212 is formed in an area above the retention grooves 211 in the inner side of the side wall 21 in order to avoid interference between the first contacts 10 and the stationary housing 20. The chamfer 212 is formed from a position above the retention grooves 211 to a position in the vicinity of the upper end 21B of the side wall 21. The chamfer 212 inclines with respect to the mating direction z, in the direction of being apart from the first sections 101 of the first contacts 10 in the second direction y with approaching from fixation retention portions 10B toward first bends C1. A chamfer 222 similar to the chamfer 212 is formed inside the side wall 22.

The expansion walls 25 are formed to be rectangular in planar view by walls standing from lower ends 25A to upper ends 25B in the mating direction z. The upper ends 25B are lower than the upper end 21B of the side wall 21 and the upper ends 31B of the movable housing 30. The expansion walls 25 contribute to fitting between the stationary housing 20 and the movable housing 30 while inwardly receiving parts of each of the movable housing 30 and the second connector 4 in both the sides of the stationary housing 20 in the first direction x. In addition, the expansion walls 25 set gaps between the stationary housing 20 and the movable housing 30 to set a floating range. It is preferable that the expansion walls 25 are formed symmetrically in the first direction x across the walls 21 to 24.

Figure 6:
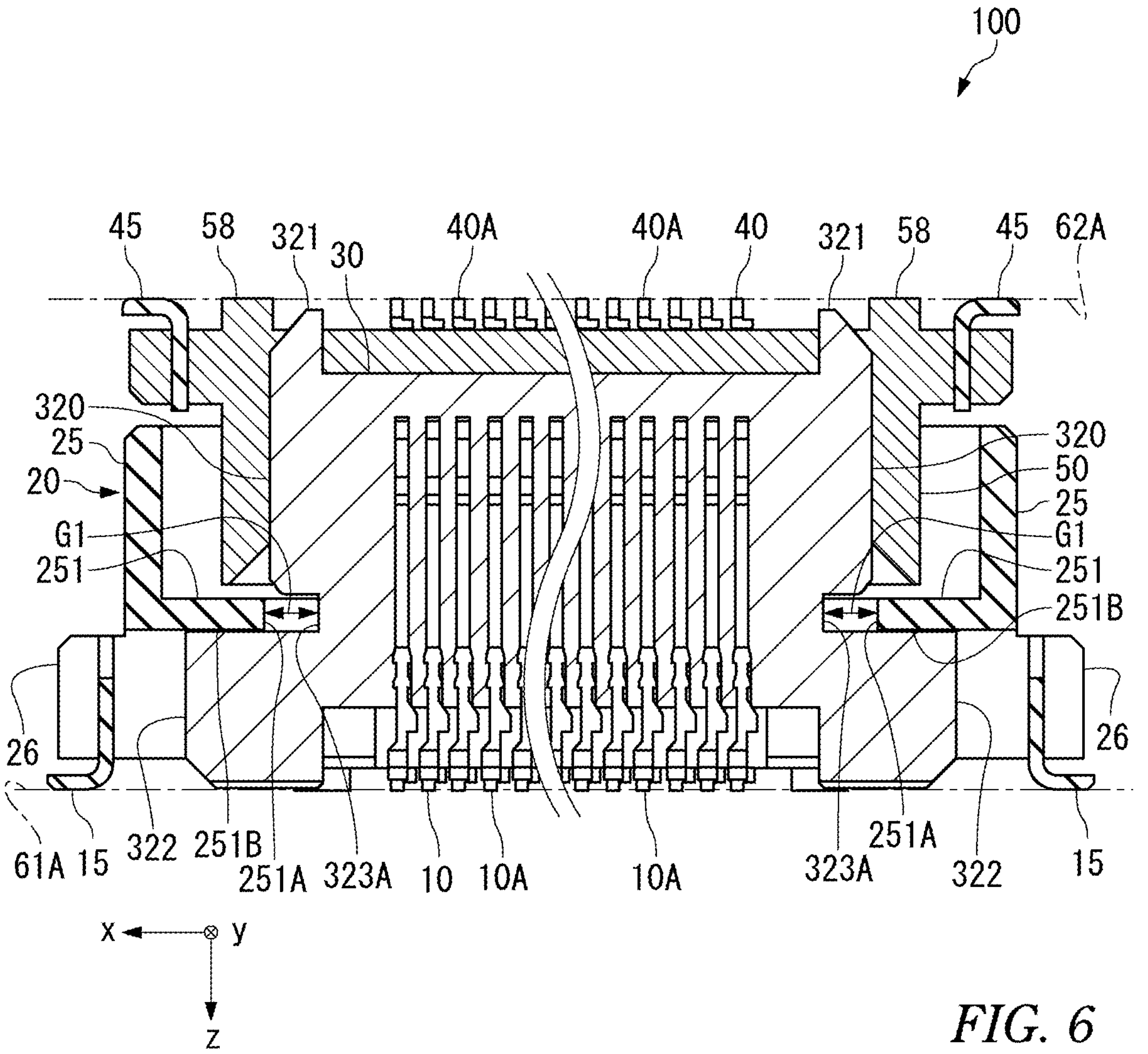
FIG. 6 is a cross sectional view that is taken along the line VI-VI of FIG. 1(*a*), and illustrates a first gap existing between the stationary housing and the movable housing in a first direction.
Figure 7:
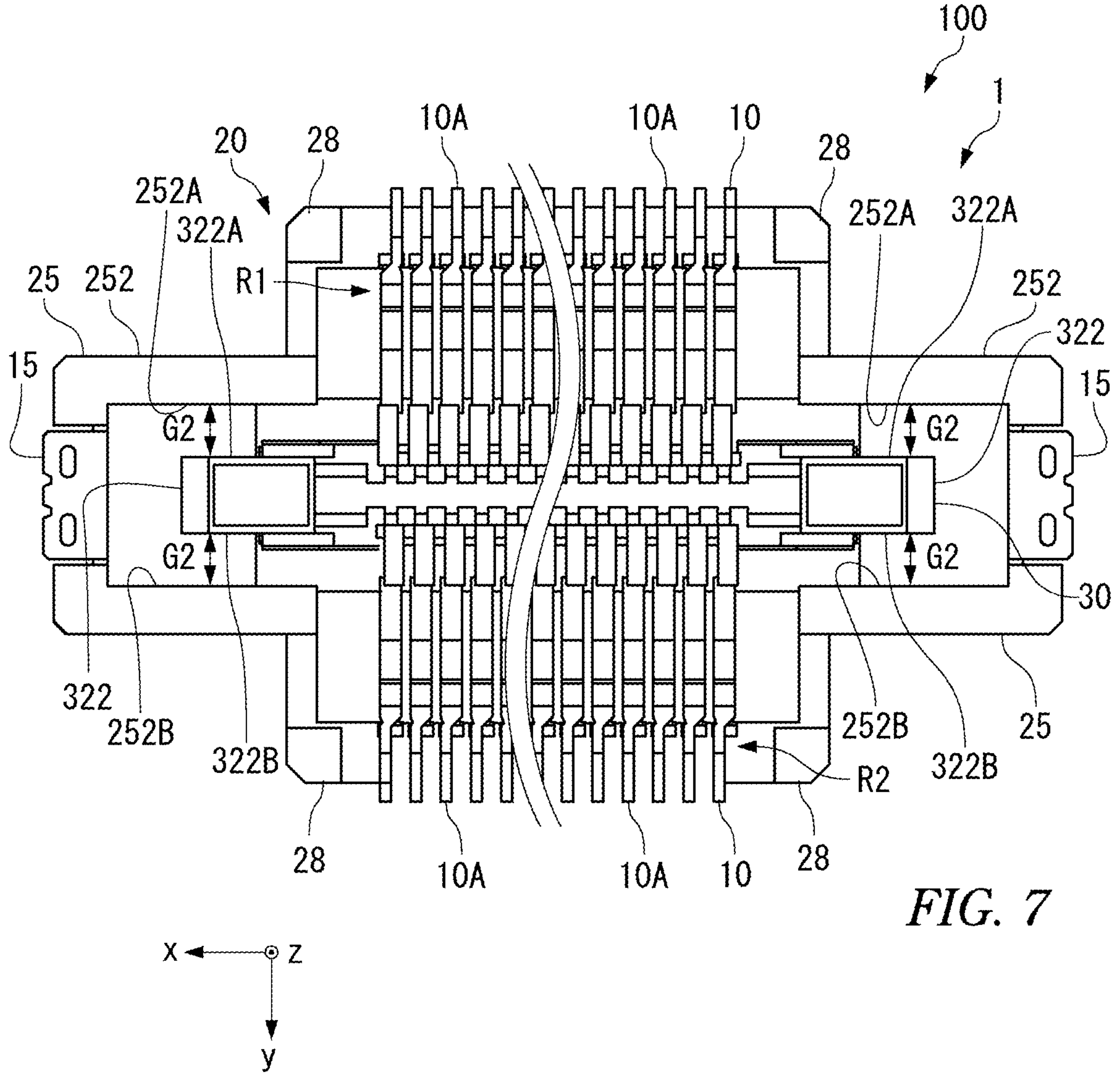
FIG. 7 is a bottom view that is viewed from the direction of the arrow VII of FIG. 1(*a*), and illustrates a second gap between the stationary housing and the movable housing in a second direction.

As illustrated in FIGS. 6 and 7, facing portions 251 that are positioned to face the first mounting surface 61A in the interior of the stationary housing 20 are formed on the expansion walls 25. The facing portions 251 set first gaps G1 in the first direction x between the stationary housing 20 and the movable housing 30. The facing portions 251 are formed to extend in the first direction x and the second direction y and to have a plate shape, and are supported by the walls of the expansion walls 25. As understood from FIG. 4, the facing portions 251 of the present embodiment are formed to have a generally C-shape in planar view. A predetermined dimension x1 is given between the facing portions 251 in one end side and the other end side in the first direction x.

The housing 50 of the second connector 4 is positioned above the facing portions 251 in the inner sides of the expansion walls 25. Areas below the facing portions 251 of the expansion walls 25 correspond to lower regions 252 (FIG. 4) that set second gaps G2 in the second direction y between the stationary housing 20 and the movable housing 30. The lower regions 252 include side walls 252A and 252B that are below the facing portions 251 and extend in the first direction x and the mating direction z.

Figure 3:
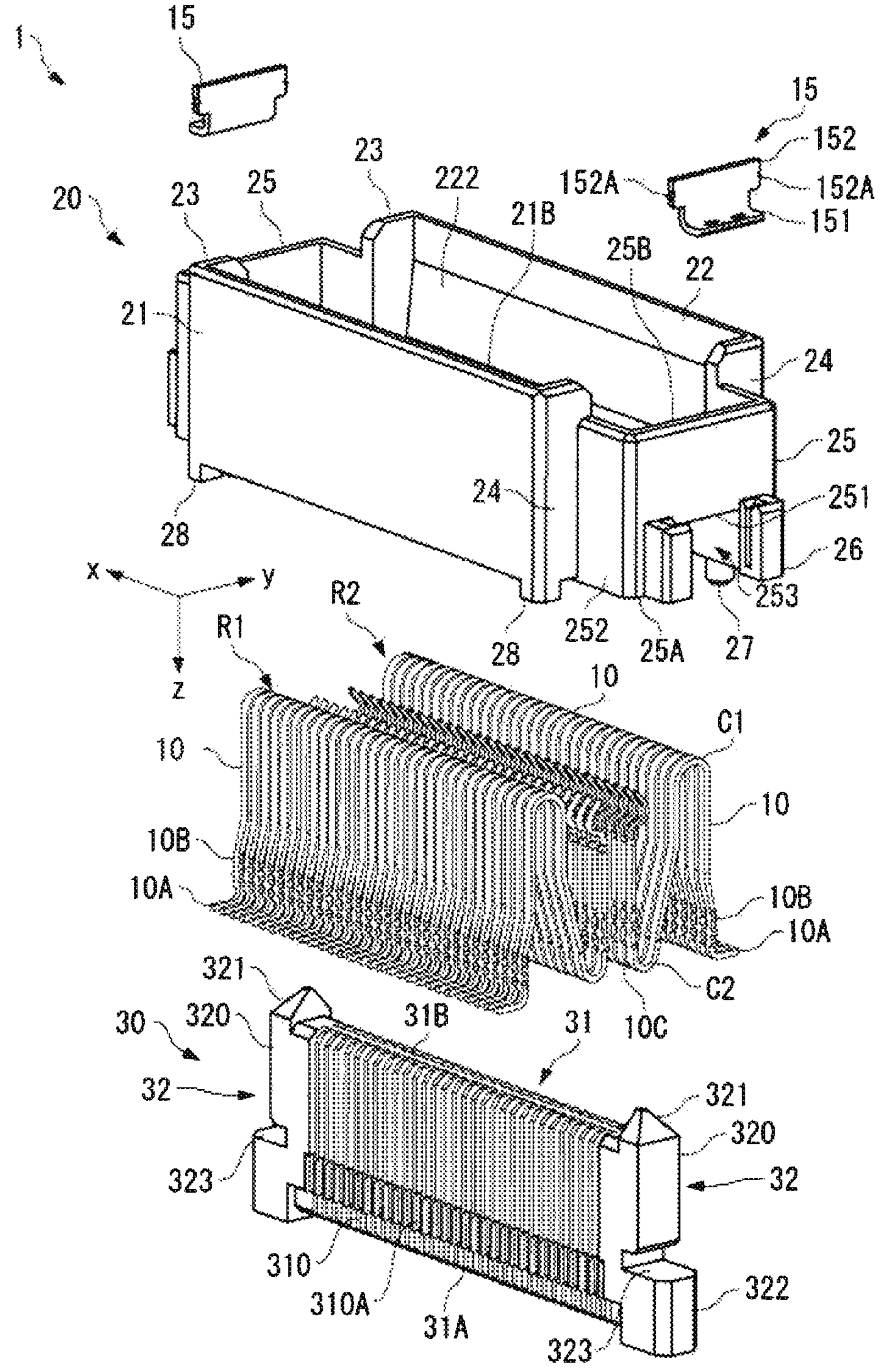
FIG. 3 is an exploded isometric view of the first connector (excluding ground contact connection elements).

The bonding element retention portions 26 are disposed on the expansion walls 25 in both the sides of the stationary housing 20 in the first direction x, and retain the housing bonding elements 15 illustrated in FIG. 3. Each housing bonding element 15 includes: a bond portion 151 that is bonded to the first circuit board 61 by solder that is not illustrated; and a press-fit portion 152 including projections 152A in both sides thereof. A pair of grooves 261 that retain each housing bonding element 15 that is press-fitted from above the bonding element retention portions 26 is formed in the bonding element retention portions 26 along the mating direction z. An opening 253 is formed below the facing portion 251 on each expansion wall 25, and between the pair of grooves 261. The opening 253 need not be formed in each expansion wall 25.

The stationary housing 20 includes the two pin-shaped bosses 27, as illustrated in FIGS. 2(*b*) and 3. The two bosses 27 protrude in the mating direction z from the lower ends of the side walls 21 and 22 or the partial walls 23 and 24, and are separated from each other in both the first direction x and the second direction y. The diameters of the bosses 27 differ from each other. Therefore, the first connector 1 can be attached to the first circuit board 61 in a correct direction in which the two bosses 27 can be introduced into the holes of the first circuit board 61.

(Movable Housing)

The movable housing 30 sections the interior of the stationary housing 20 into an area closer to the first row R1 and an area closer to the second row R2, as illustrated in FIGS. 2(*a*), 2(*b*), and 5 (*a*), and retains, together with the stationary housing 20, the first contacts 10 in the first row R1 and the contacts 10 in the second row R2. The movable housing 30 extends in the first direction x to have a length corresponding to the lengths of the rows R1 and R2, and includes: a retainer region 31 in which the first contacts 10 are retained; and expanded regions 32 that are contiguous to both sides of the retainer region 31 in the first direction x, and take part in location with respect to the second connector 4, fitting with the stationary housing 20, and setting of a floating range.

The retainer region 31 is allowed to have a width (dimension in second direction y) and a height (dimension in mating direction z) that are necessary for retaining the first contacts 10 in the first row R1 and the first contacts 10 in the second row R2. A plurality of grooves 310 in which the first contacts 10 are positioned are formed along the mating direction z in each of a side 311, closer to the first row R1, and a side 312, closer to the second row R2, of the retainer region 31. Guiding slopes 31C are formed on a side, closer to the first row R1, and a side, closer to the second row R2, in the upper ends 31B of the retainer region 31 in order to locate the movable housing 30 with respect to the second contacts 40 of the second connector 4 in the second direction y.

The grooves 310 include retention grooves 310A in which the first contacts 10 are press-fitted, and all the grooves 310 are successive over the entire height of each of the sides 311 and 312. The grooves 310 are arranged at a constant pitch in the first direction x. The depth (dimension in second direction y) of each groove 310 varies in the mating direction z, as illustrated in FIG. 2(*b*). The retention grooves 310A are formed in the vicinity of a lower end 31A of the retainer region 31.

Ground retention grooves 31D (FIG. 2(*b*)) into which the ground contact connection element 17 is press-fitted are formed in the lower end 31A of the retainer region 31. In the retainer region 31, the plurality of ground retention grooves 31D formed by making dents from the lower end 31A toward above are scattered in the first direction x.

The expanded regions 32 include: upper portions 320 on which guide projections 321 positioned above the upper ends 31B of the sides 311 and 312 are formed; and lower portions 322 positioned below the facing portions 251 of the stationary housing 20. The expanded regions 32 are preferably formed symmetrically about the retainer region 31 in the first direction X.

Recesses 323 formed by making dents in the first direction x at positions corresponding to the facing portions 251 are formed in the expanded regions 32. The upper portions 320 and the lower portions 322 are partitioned by the recesses 323. The dimensions of the inner sides of the recesses 323 in the mating direction z are equivalent to or greater than the plate thicknesses of the facing portions 251. Depending on the relative positions of the movable housing 30 and the stationary housing 20, the facing portions 251 are introduced into the insides of the recesses 323. The recesses 323 can receive the facing portions 251 up to hitting of the end surfaces 251A of the facing portions 251 on the inmost faces 323A of the recesses 323.

The guide projections 321 come into contact with the housing 50 before the guiding slopes 31C come into contact with the housing 50 or second contacts 40 of the second connector 4. Then, the guide projections 321 guide the movable housing 30 in the first direction x and the second direction y while following the position of the housing 50. Therefore, a slope 321A inclined toward the yz plane and slopes 321B inclined toward the xz plane are formed on each guide projection 321.

Figure 5A:
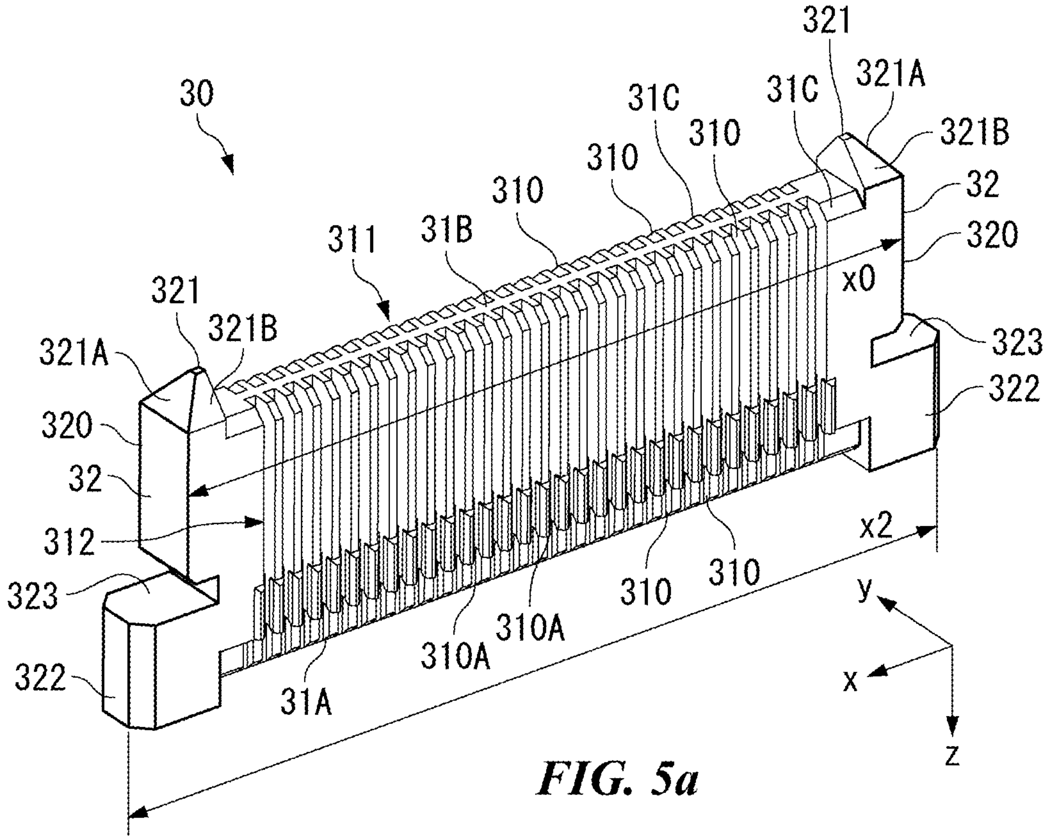
FIG. 5(*a*) is an isometric view illustrating the movable housing of the first connector.
Figure 5B:
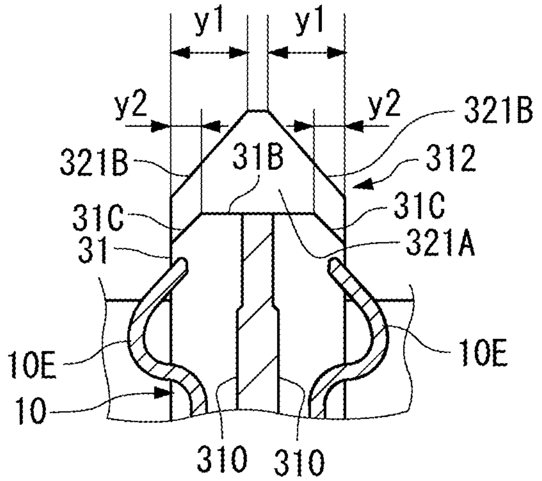
Figure 5C:
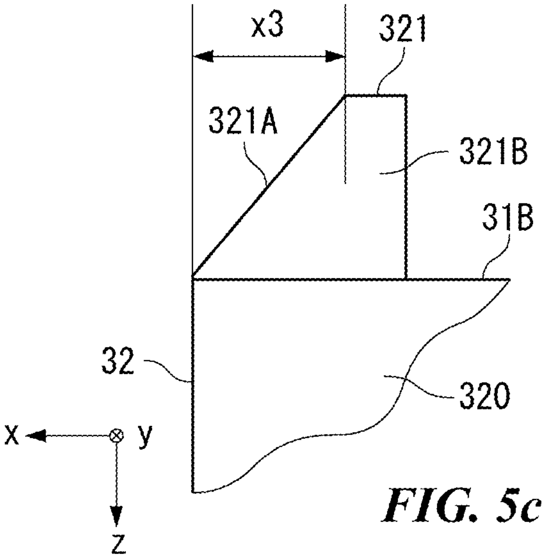

As illustrated in FIG. 5(*b*), guiding ranges y1 that enable the movable housing 30 to be displaced in the second direction y by guiding by the slopes 321B are set on the slopes 321B of each guide projection 321. Each guiding range y1 is wider than each guiding range y2 that enables the movable housing 30 to be displaced in the second direction y by guiding by each guiding slope 31C. As illustrated in FIG. 5(*c*), a guiding range x3 that enables the movable housing 30 to be displaced in the first direction x by guiding by the slope 321A is set on the slope 321A of each guide projection 321.

The dimension x0 (FIG. 5(*a*)) of each upper portion 320 in the first direction x is less than the dimension x1 (FIG. 4) between the facing portions 251 in both the sides. In contrast, the dimension x2 (FIG. 5(*a*)) of each lower portion 322 in the first direction x is more than the dimension x1 (FIG. 4) between the facing portions 251 on both the sides. Therefore, the movable housing 30 can be introduced from a lower area into the interior of the stationary housing 20 up to hitting of the lower portions 322 on lower surfaces 251B of the facing portions 251, as illustrated in FIG. 6. In such a case, the upper portions 320 are accommodated up to positions above the facing portions 251 by the stationary housing 20. The upper portions 320 are mated with the housing 50 of the second connector 4. The housing 50 is positioned to surround the upper portions 320 in the stationary housing 20.

When the first contacts 10 and the housing bonding elements 15 are bonded to the first circuit board 61 to fix the stationary housing 20 to the first circuit board 61, the lower portions 322 are positioned between the facing portions 251 and the first mounting surface 61A of the first circuit board 61. The movable housing 30 is fitted to the stationary housing 20 and the first circuit board 61 in the state of being prevented from being removed upward and downward because the lower portions 322 are sandwiched between the facing portions 251 and the first circuit board 61 in the mating direction z. Therefore, the first connector 1 need not include fixation fittings or the like for fitting the movable housing 30, the stationary housing 20, and the first circuit board 61, and the movable housing 30 and the stationary housing 20 are not restrained by such fixation fittings or and the like.

As illustrated in FIG. 6, each first gap G1 having a predetermined dimension is set between the end surface 251A of the facing portion 251 and the inmost face 323A of the recess 323 in each of both the sides of the first connector 1 in the first direction x. FIG. 6 illustrates a state in which the centers of the stationary housing 20 and the movable housing 30 in the first direction x coincide with each other. The relative displacement of the movable housing 30 in the first direction x from the state toward the right or left sides of FIG. 6 with respect to the stationary housing 20 is permitted up to the dimension of each first gap G1. For example, in a case in which each first gap G1 is 1 mm, the first connector 1 is allowed to have a floating range of ±1 mm in the first direction x.

As illustrated in FIG. 7, the second gaps G2 are set between a side wall 322A of each lower portion 322 and the inner surface of the side wall 252A of each lower region 252, and between a side wall 322B of each lower portion 322 and the inner surface of the side wall 252B of each lower region 252, respectively. FIG. 7 illustrates a state in which the centers of the stationary housing 20 and the movable housing 30 in the second direction y coincide with each other. The relative displacement of the movable housing 30 in the second direction y from the state toward the upper or lower sides of FIG. 7 with respect to the stationary housing 20 is permitted up to the dimension of each second gap G2. For example, in a case in which each second gap G2 is 1 mm, the first connector 1 is allowed to have a floating range of +1 mm in the second direction y. Since the movable housing 30 and the stationary housing 20 can be relatively displaced in the first direction x and the second direction y, the movable housing 30 also has the degree of positional freedom in a rotation direction in the xy plane with respect to the stationary housing 20. The first connector 1 is allowed to have a floating range at a predetermined angle to the rotation direction in the xy plane. A floating range corresponding to the sufficiently large gaps G1 and G2 can be achieved up to the maximum elastic deformation volume of each first contact 10 because the movable housing 30 and the stationary housing 20 are not restrained.

(First Contact)

Figure 8A:
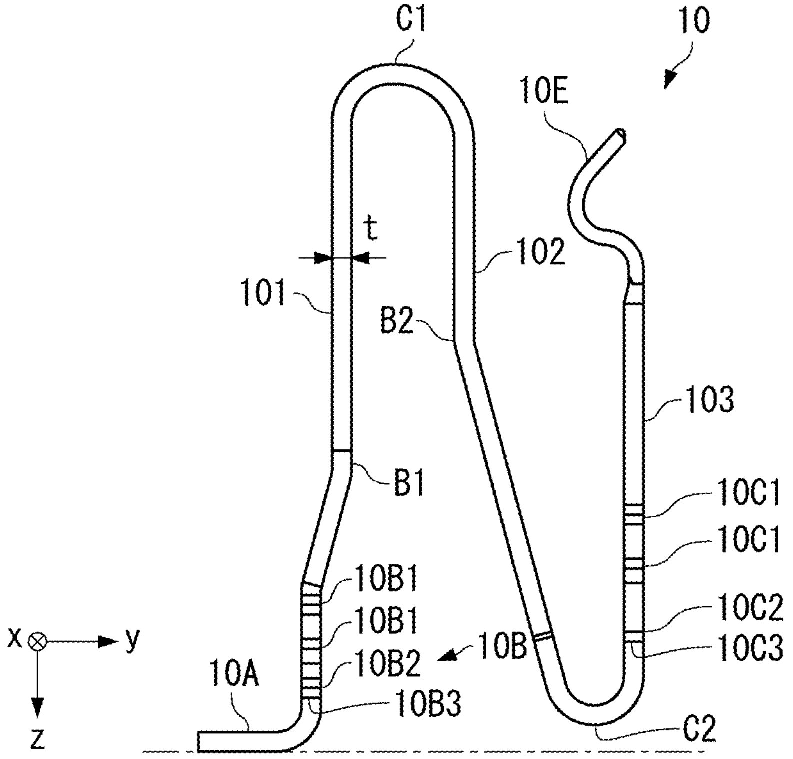
FIG. 8(*a*) is a side view of a first contact.
Figure 8B:
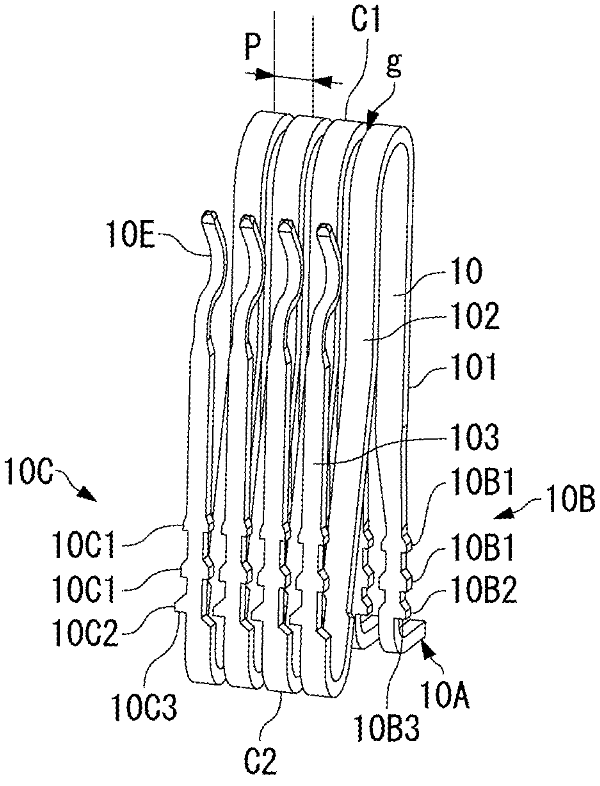
Figure 8C:
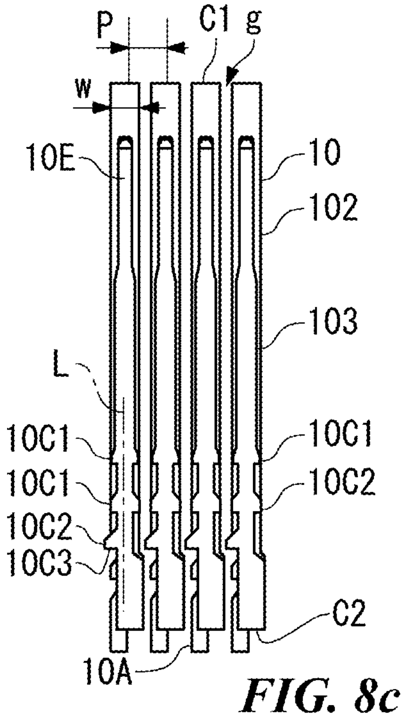

Configurations such as the shapes of the first contacts 10 illustrated in FIGS. 8(*a*) to 8(*c*), and the function of each site are described. FIGS. 8(*a*) to 8(*c*) illustrate the first contacts 10 in a state in which no load is applied to the first contacts 10. Each first contact 10 includes: a bond portion 10A that is bonded to the first mounting surface 61A by solder; a fixation retention portion 10B that is retained by the stationary housing 20 by press-fitting; a movable retention portion 10C that is retained by the movable housing 30 by press-fitting; and a terminating end 10E that comes into contact with each second contact 40. Each first contact 10 has a shape curved so that the first contact 10 can be elastically deformed in the first direction x and the second direction y.

The bond portion 10A and the fixation retention portion 10B that are positioned in parallel to the first mounting surface 61A have an L-shape in side view. A first bend C1 and a second bend C2 are formed between the fixation retention portion 10B and the movable retention portion 10C. The first bend C1 as the top of each first contact 10 has an inverted U-shape in side view. The second bend C2 has a generally V-shape in side view. The lower end of the second bend C2 is located above the bond portion 10A. The terminating end 10E has a generally C-shape in side view. The upper end of the terminating end 10E is located below the upper end of the first bend C1. Each first contact 10 is bent in a generally N-shape as an overall general shape.

The first contacts 10 are molded by stamping a plate material, formed of a metal material such as a copper alloy, to have a linear, long, and narrow shape, and further subjecting the plate material to bending working. The floating range is set within the elastic region of each first contact 10 for each of the first direction x, the second direction y, and the rotation direction in the xy plane. Therefore, a material having a favorable spring property among the copper alloys is preferably used as the material of each first contact 10 from the viewpoint of increasing such a floating range.

Each first contact 10 is allowed to have a certain plate thickness over a very large portion of the first contact 10 in the lengthwise direction thereof. The plate thickness t of the first contact 10 is set to be, for example, in a range of 0.1 to 0.5 mm. The plate thickness of the terminating end 10E is smaller than the plate thicknesses of the other portions.

The width w of each first contact 10 is set to be a value that is equal to or greater than at least the plate thickness t, for example, in a range of 0.1 to 0.5 mm in order to stably mold the first contacts 10. The width w of each first contact 10 varies in the lengthwise direction of each first contact 10. For example, the widths of the bond portion 10A and the terminating end 10E are allowed to be the smallest in the overall length from the bond portion 10A of each first contact 10 to the terminating end 10E in order to facilitate bending to enhance followability to the first mounting surface 61A and the second contacts 40. A region above the movable retention portion 10C of each first contacts 10 has a width that is smaller than the width of the movable retention portion 10C. The region is smoothly introduced from below into each retention groove 310A of the movable housing 30.

The first contacts 10 are positioned in a state in which a gap g is opened between first contacts 10 adjacent to each other at a certain pitch P that is greater than the maximum width w set in the first bend C1 and the second bend C2. The pitch P is, for example, 0.3 to 0.5 mm, and the first contacts 10 are positioned in a fine manner. The gap g is preferably 0.15 mm or more. All the first contacts 10 are positioned in parallel to the xz plane. The first contacts 10 in the first row R1 and the first contacts 10 in the second row R2 are positioned in line symmetry with reference to an axis parallel to the mating direction z.

Each first contacts 10 includes a first section 101, a second section 102, and a third section 103. The first section 101 extends from the fixation retention portion 10B to the first bend C1 toward a side (upper side) opposite to the first mounting surface 61A. The second section 102 extends from the first bend C1 that is bent in an upward convex manner toward the first mounting surface 61A, and is contiguous to the movable retention portion 10C via the second bend C2. The third section 103 extends from the movable retention portion 10C to the terminating end 10E that is connected to each second contact 40 toward the side opposite to the first mounting surface 61A.

A first bent portion B1 formed to have a shape convex toward the second section 102 is formed in the first section 101. In the second section 102, a second bent portion B2 formed to have a shape convex toward the first section 101 is formed at a position farther from the first mounting surface 61A than the position of the first bent portion B1 in the mating direction z.

As shown in FIGS. 8(*b*) and 8(*c*), the fixation retention portion 10B includes two press-fit projections 10B1 formed in two stages in an upward-downward direction on both sides of the fixation retention portion 10B in a width direction (corresponding to the first direction x), and a projection 10B2 formed on one side in the width direction. On the rear (lower part) of the projection 10B2 in a press-fitting direction, a press portion 10B3 that is pressed by a jig, which is not illustrated, when the fixation retention portion 10B is press-fitted is formed perpendicularly to a central line L.

The movable retention portion 10C includes press-fit projections 10C1, a locating projection 10C2, and a press portion 10C3 similar to the press-fit projections 10B1, the projection 10B2, and the press portion 10B3 of the fixation retention portion 10B. A dimension by which the locating projection 10C2 protrudes in the first direction x from the central line L of each first contact 10 in the width direction is greater than a dimension by which each press-fit projection 10C1 protrudes from the central line L in the first direction x.

(Ground Contact Connection Element)

Some of the first contacts 10 included in the first row R1 correspond to a signal potential in an electronic circuit including the first circuit board 61 and the second circuit board 62, and the remainder correspond to the ground potential in the electronic circuit. Likewise, some of the first contacts 10 included in the second row R2 correspond to the signal potential in the electronic circuit, and the remainder correspond to the ground potential in the electronic circuit. An assignment for a signal/ground to the first contacts 10 is appropriately designed. Examples of the assignment for a signal/ground include various patterns depending on a product.

Figure 9:
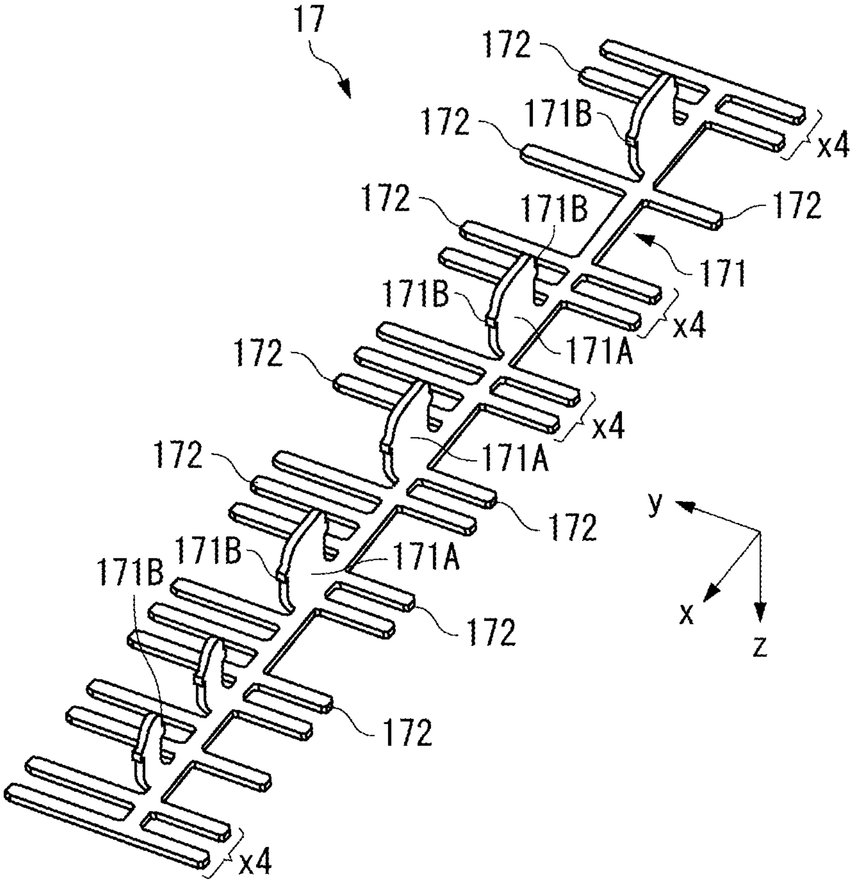
FIG. 9 is an isometric view of a ground contact connection element.
Figure 10:
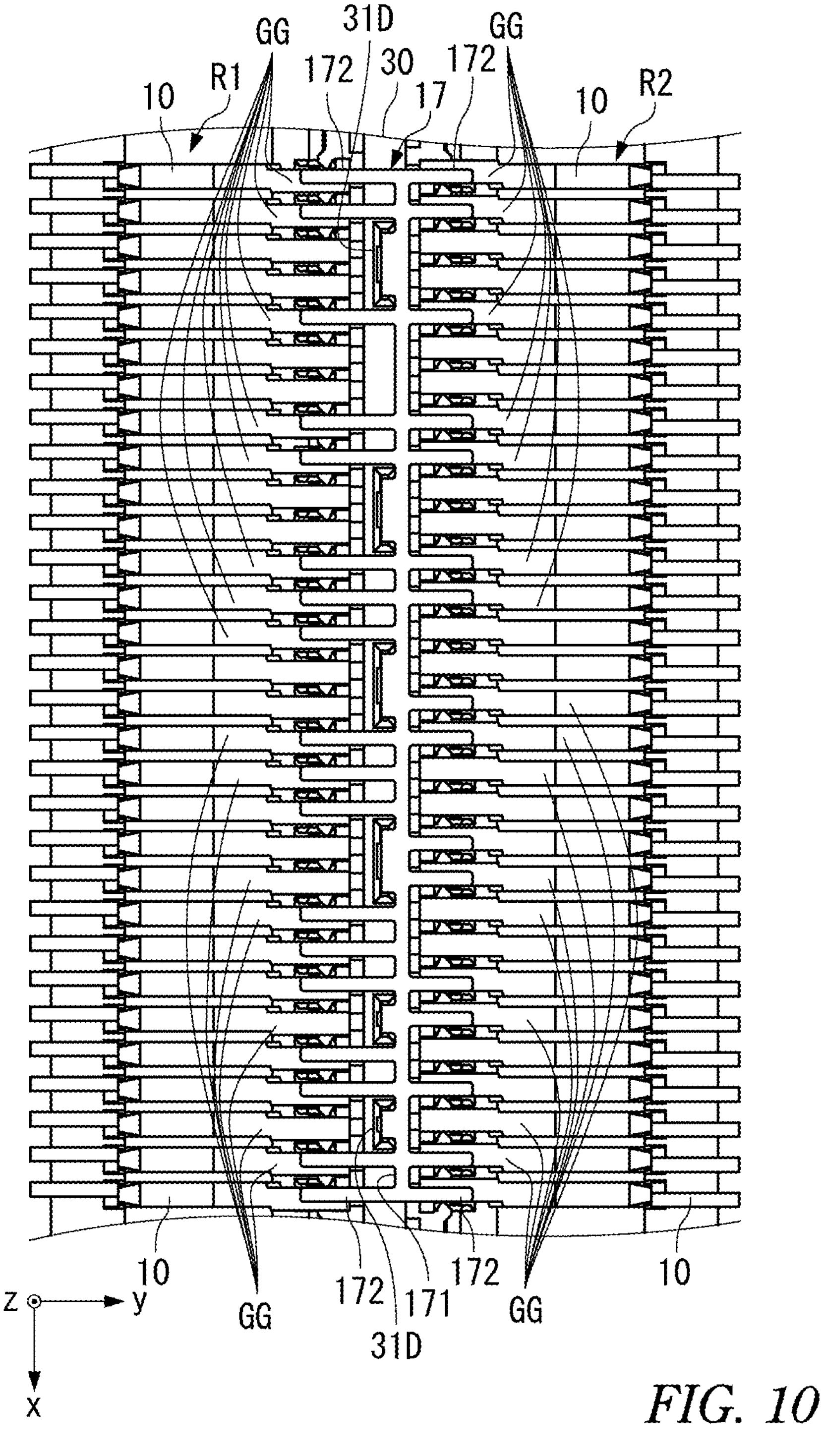
FIG. 10 is a bottom view of the ground contact connection elements and the first contacts.

As illustrated in FIGS. 9 and 10, the ground contact connection element 17 comes into contact only with ground contact groups GG including the plurality of first contacts 10 assigned for a ground, among all the first contacts 10. All of the first contacts 10 with which the ground contact connection element 17 comes into contact have an equal potential. On account of illustration, reference characters GG are separately indicated in four places in FIG. 10. The ground contact groups GG correspond to groups of the first contacts 10 corresponding to the ground potential as the entire ground contact connection element 17. The ground contact groups GG correspond to some first contacts 10 in the first row R1 and some first contacts 10 in the second row R2.

The ground contact connection element 17 includes: a support 171 that is disposed on the lower end 31A of the movable housing 30 and extends in the first direction x; and a plurality of contact beams 172 that come into contact with the second bend C2 of each of the first contacts 10 included in the ground contact groups GG. The contact beams 172 are positioned between the lower end 31A and the first mounting surface 61A, and come into contact with the second bends C2 of the first contacts 10 adjacent to the lower end 31A from an area closer to the first mounting surface 61A.

The second bend C2 of each first contact 10 is located in the vicinity of the movable retention portion 10C retained by the movable housing 30, and is therefore displaced while following the movable housing 30. Therefore, a distance between the second bend C2 and the movable housing 30 do not substantially vary even in a case in which the movable housing 30 is displaced with respect to the stationary housing 20 and the housing 50 of the second connector 4 while elastically deforming the first bend C1 of each first contact 10 when the first connector 1 and the second connector 4 are mated with each other. Thus, the behavior of displacement of the movable housing 30 in a floating range with respect to the stationary housing 20 is not influenced even in a case in which the contact beams 172 come into contact with the second bend C2.

A plurality of retention portions 171A that are press-fitted into the ground retention grooves 31D of the movable housing 30, respectively, are disposed on the support 171. Press-fit projections 171B are formed on both sides of each retention portion 171A in the first direction x.

Each contact beam 172 protrudes in the second direction y, perpendicularly from the support 171 toward the contacts 10 for a ground in the first row R1 or the contacts 10 for a ground in the second row R2. In the present embodiment, the length of each contact beam 172 that extends from the support 171 toward the first row R1 and the length of each contact beam 172 that extends from the support 171 toward the second row R2 are different from each other. However, the lengths may be equal to each other.

The widths (dimensions in the first direction x) of the contact beams 172 are less than the widths (dimensions in the first direction x) of places that come into contact with the contact beams 172 of the first contacts 10. The width of each contact beam 172 may be equivalent to that of the bond portion 10A or terminating end 10E of each first contact 10.

The ground contact connection element 17 can be molded by subjecting a metal plate material such as a copper alloy to stamping and bending working. Each retention portion 171A is bent perpendicularly on one side of the support 171 in the width direction (second direction y). The retention portions 171A can be formed in optional places in the first direction x, excluding places (for example, x4 in FIG. 9) in which the contact beams 172 are formed on both the sides of the support 171 in the width direction.

Figure 16:
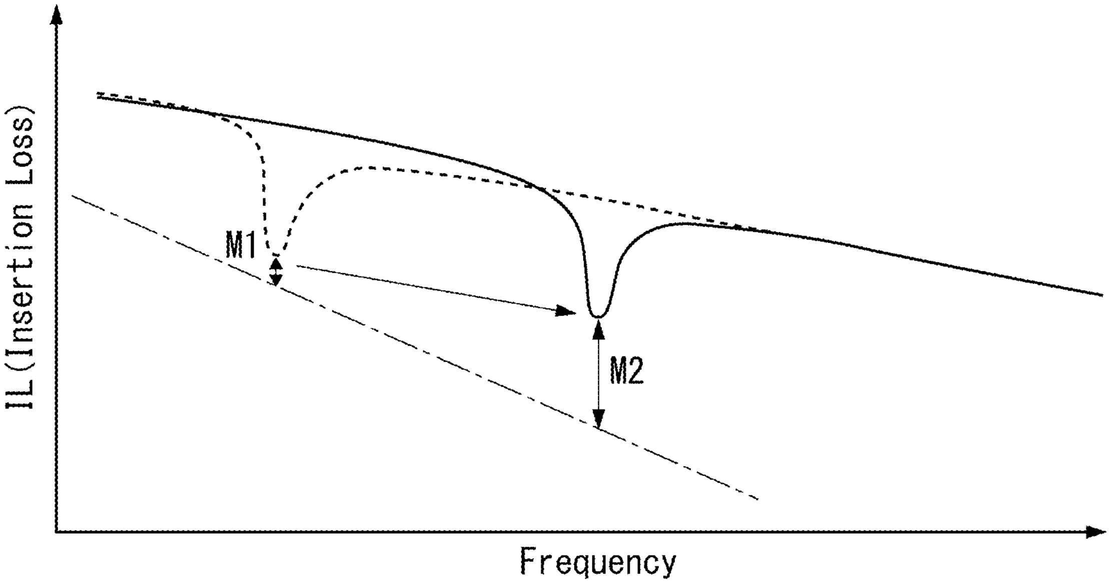
FIG. 16 is a graph for explaining an advantage offered by the ground contact connection elements.

The ground contact connection element 17 can be allowed to be ready for various products by customizing the positions of the contact beams 172 and the retention portions 171A depending on the pattern of assignment for a signal/ground. It is preferable to be able to produce the movable housing 30, of which the positions of the ground retention grooves 31D are different, by nesting portions corresponding to the ground retention grooves 31D in a mold for molding the movable housing 30 in order to enable change of the positions of the retention portions 171A by the customization, Use of the ground contact connection element 17 enables SI (signal intensity) performance to be improved, for example, as showing the analysis results of the frequency characteristics of an insertion loss (IL) in FIG. 16. The dashed line in FIG. 16 shows the frequency characteristics of an insertion loss in a case in which the first connector 1 does not include the ground contact connection element 17, and the continuous line shows the frequency characteristics of an insertion loss in the case of including the ground contact connection element 17. The alternate long and short dash line schematically shows required specifications. FIG. 16 reveals that the peak of a resonance frequency is shifted to a higher frequency by using ground contact connection element 17. Thus, a design margin for requirement specifications is increased from M1 to M2, and consequently, the SI performance is improved.

[Second Connector]

The more specific configuration of the second connector 4 is described with reference to FIGS. 11(*a*), 11(*b*), and 12. The second connector 4 includes the plurality of second contacts 40, the housing 50 that retains the second contacts 40, and bonding elements 45, and is mated with the movable housing 30. Like the first contacts 10, the second contacts 40 in the first row r1 and the second contacts 40 in the second row r2 are positioned at the constant pitch P in the first direction x, and are adjacent to each other in the second direction y.

The second contacts 40 are molded by stamping a plate material, formed of a metal material such as a copper alloy, to have a linear, long, and narrow shape, and further subjecting the plate material to bending working. Each second contact 40 includes: a bond portion 40A that is bonded to the second circuit board 62; a retention portion 40B that is retained by the housing 50; and a terminating end 40C that is electrically connected to each first contact 10.

Each second contact 40 of the present embodiment includes a section 401 that extends perpendicularly to the bond portion 40A, and is formed to have an L-shape as a whole. The section 401 includes the retention portion 40B and the terminating end 40C. Like the fixation retention portion 10B, the retention portion 40B includes press-fit projections 40B1, a projection 40B2, and a press portion 40B3, and is formed in the vicinity of the bond portion 40A in the section 401. A region below the retention portion 40B in the section 401 corresponds to the terminating end 40C. As illustrated in FIG. 1(*b*), the terminating end 10E of each first contact 10 in the first row R1 and the terminating end 10E of each first contact 10 in the second row R2 are introduced between the terminating end 40C in the first row r1 and the terminating end 40C in the second row r2.

The housing 50 includes: walls 51 to 54 that surround the second contacts 40 in the first row r1 and the second row r2 from all quarters and are positioned on the second mounting surface 62A; bonding element retention portions 56 that retain the bonding elements 45; two bosses 57 (FIG. 1(*a*)) for location that are introduced into holes, which are not illustrated, in the second circuit board 62; and a leg 58 that is positioned on the second mounting surface 62A.

The side wall 51 and the side wall 52 of which the lengths correspond to the lengths of the rows r1 and r2 extend in the first direction x, and face in the second direction y. On the inside of the side wall 51, grooves 511 in which the second contacts 40 in the first row r1 are positioned, respectively, are formed along the mating direction z. The grooves 511 include retention grooves 511A into which the second contacts 40 are press-fitted. On the inside of the side wall 52, each of the second contacts 40 in the second row r2 is also positioned, and grooves 521 including retention grooves 521A are also formed along the mating direction z.

A guiding slope 512 is formed on an inside in the lower end of the side wall 51 in order to relatively locate the movable housing 30 of the first connector 1 and the housing 50 in the second direction y. A similar guiding slope 522 is also formed on an inside in the lower end of the side wall 52. The guiding slopes 512 and 522 are formed symmetrically in the second direction y.

Figure 11A:
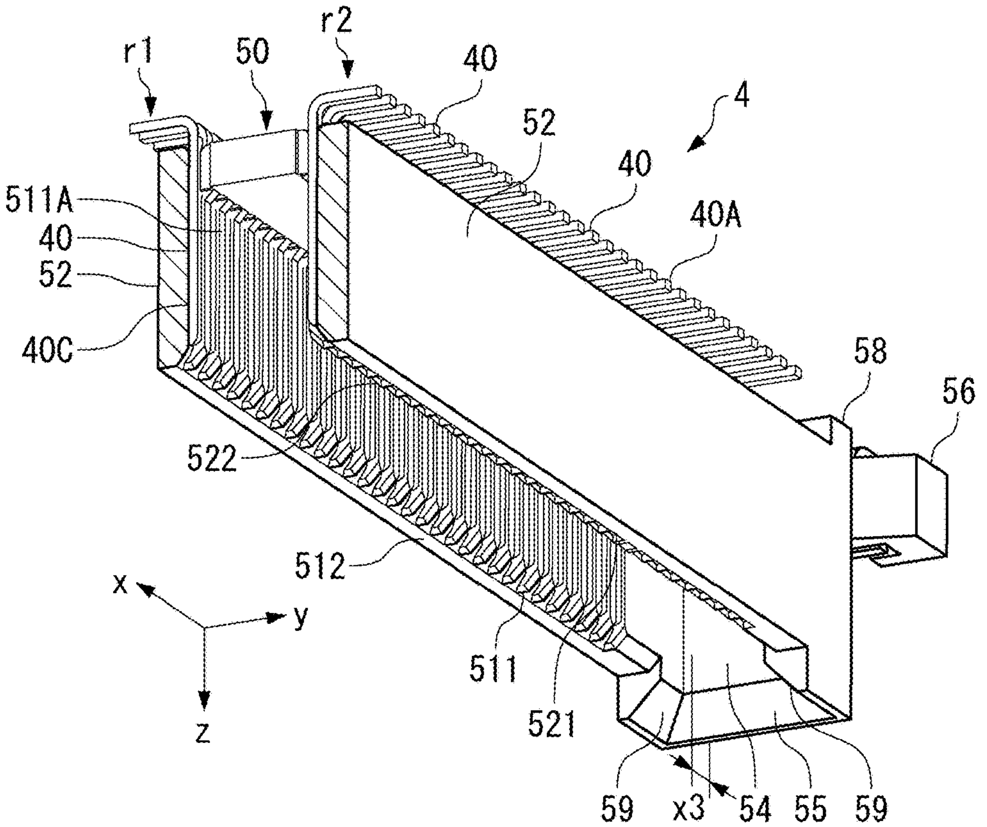
FIG. 11(*a*) is a partially cut away perspective view of the second connector.
Figure 11B:
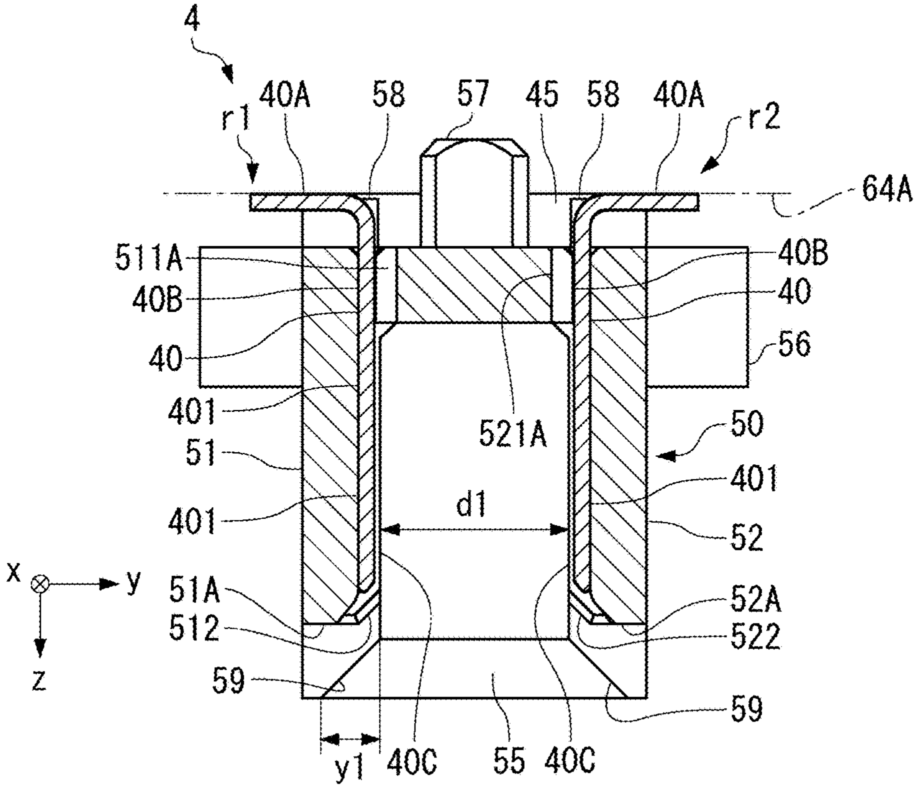

When the second contacts 40 are introduced from an area closer to the terminating ends 40C into the corresponding grooves 511 and 521 of the housing 50, and press-fitted into the retention grooves 511A and 521A, the front ends of the terminating ends 40C are positioned adjacently on the guiding slopes 512 and 522, as illustrated in FIG. 11(*b*). The bond portions 40A are positioned outside the grooves 511 and 521. The bond portions 40A are located slightly above the position of the leg 58.

A distance d1, in the second direction y, between the terminating end 40C of each second contact 40 in the first row r1 and the terminating end 40C of each second contact 40 in the second row r2 is less than a distance d2 (FIG. 2(*b*)), in the second direction y, between the vertex of the terminating end 10E of each first contact 10 in the first row R1 and the vertex of the terminating end 10E of each first contact 10 in the second row R2. When the first connector 1 and the second connector 4 are mated with each other as illustrated in FIG. 1(*b*), the terminating ends 10E of the first contacts 10 in the first row R1 come into contact with the terminating ends 40C of the second contacts 40 at the vertices thereof while being pressed between the second contacts 40 in the first row r1 and the movable housing 30. The same applies to the terminating ends 10E of the first contacts 10 in the second row R2. Since the terminating ends 40C of the second contacts 40 are formed linearly in the mating direction z, the terminating ends 40C and the terminating ends 10E can be stably brought into contact with each other even in a case in which the positions of the first contacts 10 and the second contacts 40 in the mating direction z deviate.

The walls 53 and 54 are disposed on both sides of the side walls 51 and 52 in the first direction x, and face each other in the first direction x. The height of the wall 53 or 54 from the second mounting surface 62A is greater than the height of the side wall 51 or 52 from the second mounting surface 62A.

First guiding slopes 55 that incline toward the yz plane are formed on both ends of the walls 51 to 54 in the first direction x. Second guiding slopes 59 that incline toward the xz plane are formed at the four corners of the walls 51 to 54. The guiding slopes 55 and 59 are positioned below the lower ends 51A and 52A of the side walls 51 and 52. The first guiding slopes 55 are formed symmetrically in the first direction x. The second guiding slopes 59 are formed symmetrically in the second direction y.

The first guiding slopes 55 come into contact with the slopes 321A of the guide projections 321 of the movable housing 30 before the guiding slopes 512 and 522 of the side walls 51 and 52 come into contact with the guiding slopes 31C of the movable housing 30. Then, the first guiding slopes 55 guide the movable housing 30 in the first direction x while following the position of the housing 50. At the same time, the second guiding slopes 59 come into contact with the slopes 321B of the guide projections 321 of the movable housing 30 before the guiding slopes 512 and 522 of the side walls 51 and 52 come into contact with the guiding slopes 31C of the movable housing 30. Then, the second guiding slopes 59 guide the movable housing 30 in the second direction y while following the position of the housing 50. The first guiding slopes 55 incline toward the yz plane. The second guiding slopes 59 incline toward the xz plane.

A guiding range x3 (FIG. 11(*a*)) equivalent to that of the slope 321A of each guide projection 321 of the movable housing 30 is set on each first guiding slope 55. The guiding range x3 is preferably greater than the dimension of each first gap G1. A guiding range y1 (FIG. 11(*b*)) equivalent to that of the slope 321B of each guide projection 321 of the movable housing 30 is set on each second guiding slope 59. The guiding range y1 is preferably greater than the dimension of each second gap G2.

Each bonding element 45 includes: a bond portion 451 that is bonded to the second circuit board 62; and a press-fit portion 452 of which both sides include projections 452A. The bonding element retention portions 56 are disposed outside the walls 53 and 54. A retention groove 56A into which each bonding element 45 is press-fitted from a lower area is formed in each bonding element retention portion 56.

[Assembly of Connector Assembly, and Effects of Present Embodiment]

Hereinafter, a procedure of assembling the connector assembly 100 is described, and principal effects obtained by the present embodiment are also described. First, an example of a procedure of assembling a first connector 1 is described. The housing bonding elements 15 are press-fitted from above into the pair of grooves 261 disposed on the expansion walls 25, respectively, on both the sides of the stationary housing 20 (FIG. 2(*a*)). Moreover, the movable housing 30 is positioned from below into the interior of the stationary housing 20 (FIGS. 2(*b*) and 6).

Then, the plurality of first contacts 10 can be attached from below to the stationary housing 20 and the movable housing 30 using jigs that are not illustrated. For example, the stationary housing 20 and the movable housing 30 are supported at predetermined positions by a first jig, and the first contacts 10 in the first row R1 and the second row R2 are pressed upward by a third jig that is brought into contact with the press portions 10B3 and the third jig that is brought into contact with the press portions 10C3 while the first contacts 10 are arranged in alignment to the first row R1 and the second row R2 by a second jig.

Then, the first contacts 10 in each of the rows R1 and R2 are introduced from an area closer to the first bends C1 and the terminating ends 10E into between the stationary housing 20 and the movable housing 30. As illustrated in FIG. 2(*b*), the fixation retention portions 10B of the first contacts 10 in the first row R1 are press-fitted into the retention grooves 211 of the stationary housing 20, and the movable retention portions 10C of the first contacts 10 in the first row R1 are press-fitted into the retention grooves 310A, closer to the first row R1, of the movable housing 30. Simultaneously, the fixation retention portions 10B of the first contacts 10 in the second row R2 are press-fitted into the retention grooves 221 of the stationary housing 20, and the movable retention portions 10C of the first contacts 10 in the second row R2 are press-fitted into the retention grooves 310A, closer to the second row R2, of the movable housing 30.

When the fixation retention portions 10B and the movable retention portions 10C are press-fitted, the movable housing 30 is supported by the second bends C2 of the first contacts 10 in the first row R1 and the second bends C2 of the first contacts 10 in the second row R2. In such a case, the lower end 31A of the movable housing 30 is located above the legs 28 of the stationary housing 20. The second bends C2 are located below the lower end 31A of the movable housing 30, and located above the legs 28. The bond portions 10A of the contacts 10 are located slightly below the legs 28 of the stationary housing 20.

After the attachment of first contact 10, the retention portions 171A are press-fitted into the ground retention grooves 31D to attach the ground contact connection element 17 to the movable housing 30. When the retention portions 171A are press-fitted into the ground retention grooves 31D at a predetermined depth, each contact beam 172 is bent in a plate thickness direction, and pressed in the mating direction z against the second bend C2 of each first contact 10 for a ground. Therefore, the contact beams 172 can be stably brought into contact with the contact groups GG even in a case in which the positions of the second bends C2 of the first contacts 10 vary in the mating direction z. SI performance can be stabilized by allowing the contacts 10 for a ground to have the same potential by the element 17 including the contact beams 172 that are stably brought into contact with the first contacts 10 in such a manner.

As a result, the assembly of the first connector 1 is completed (FIGS. 2(*a*) and 2(*b*)). The movable housing 30 is supported in the state of having the degree of positional freedom over the floating ranges in the first direction x, the second direction y, and the rotation direction in the xy plane by elastic deformation of the first contacts 10 in the first row R1 and the first contacts 10 in the second row R2.

The two bosses 27 of the stationary housing 20 are introduced into the holes, which are not illustrated, of the first circuit board 61, respectively, to bring the legs 28 into contact with the first mounting surface 61A in a case in which the first connector 1 is positioned and mounted on the first circuit board 61 as illustrated in FIG. 1(*b*). In such a state, the bond portion 10A of each first contact 10 is bonded, by solder, to a terminal portion that is formed on the first mounting surface 61A and is not illustrated, and the bond portions 151 of the housing bonding elements 15 are bonded to the first mounting surface 61A by solder. The bonding strength between the first circuit board 61 and the first connector 1 are increased by using the housing bonding elements 15.

When the stationary housing 20 is fixed to the first circuit board 61 by the bonding of the first contacts 10 and the housing bonding elements 15, the lower portions 322 of the movable housing 30 is positioned between the first circuit board 61 and the facing portions 251 of the stationary housing 20 as illustrated in FIG. 6, and therefore, the movable housing 30, the stationary housing 20, and the first circuit board 61 are fitted to each other.

Figure 12:
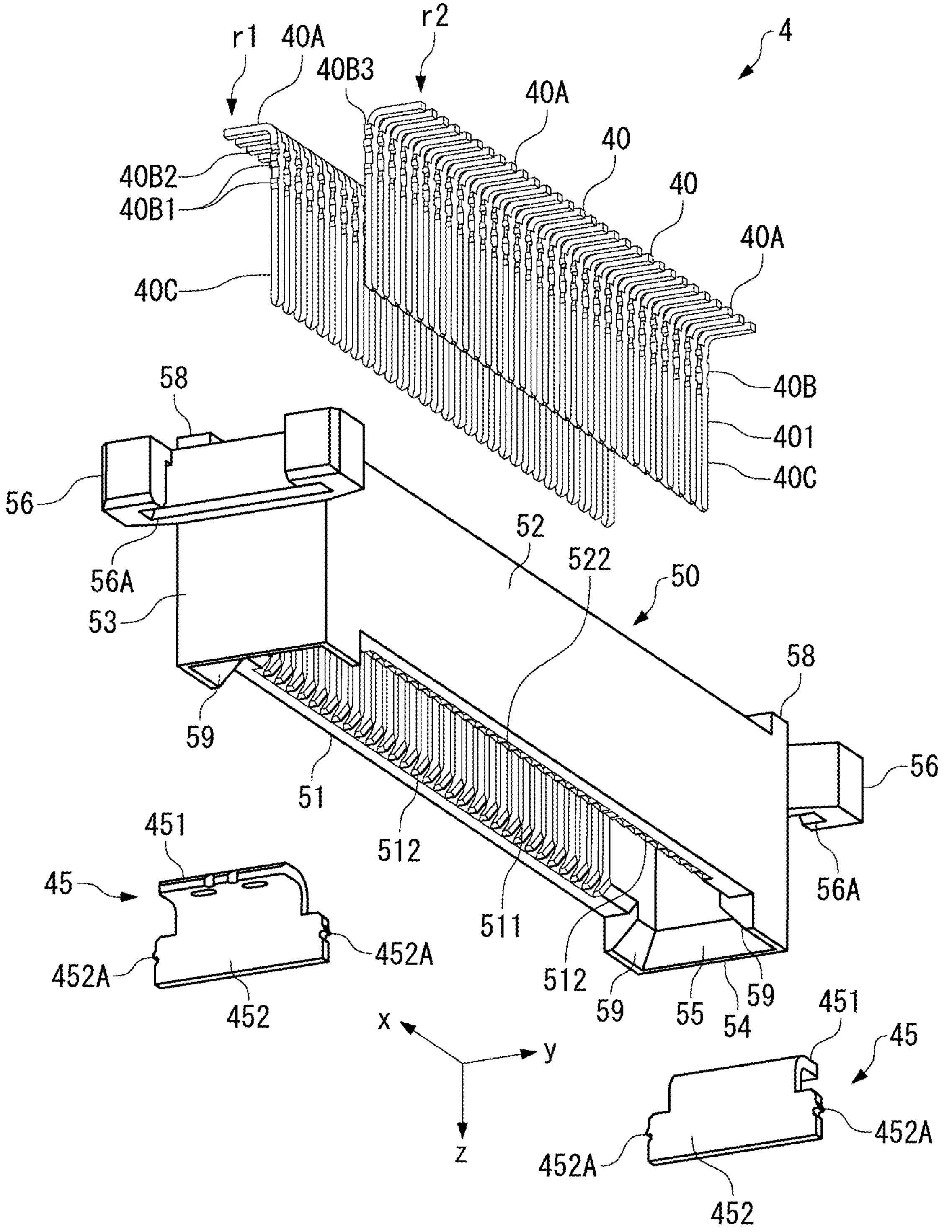
FIG. 12 is an exploded isometric view of the second connector.

In a case in which the second connector 4 is assembled (FIGS. 11 and 12), the second contacts 40 are introduced from above into the grooves 511 and 521 of the housing 50 while arranging the second contacts 40 in each of the first row r1 and the second row r2, for example, using jigs, which are not illustrated, and the press portions 40B3 are pressed to press-fit the second contacts 40 into the retention grooves 511A and 521A. Moreover, the bonding elements 45 are press-fitted into the bonding element retention portions 56. As a result, the assembly of the second connector 4 is completed.

The bosses 57 of the housing 50 are introduced into holes, which are not illustrated, of the second circuit board 62 to bring the leg 58 into contact with the contact second mounting surface 62A in a case in which the second connector 4 is positioned and mounted on the second circuit board 62. In such a state, the bond portion 40A of each second contact 40 is bonded to the second mounting surface 62A by solder, and the bond portions 451 of the bonding elements 45 are bonded to the second mounting surface 62A by solder.

Figure 13:
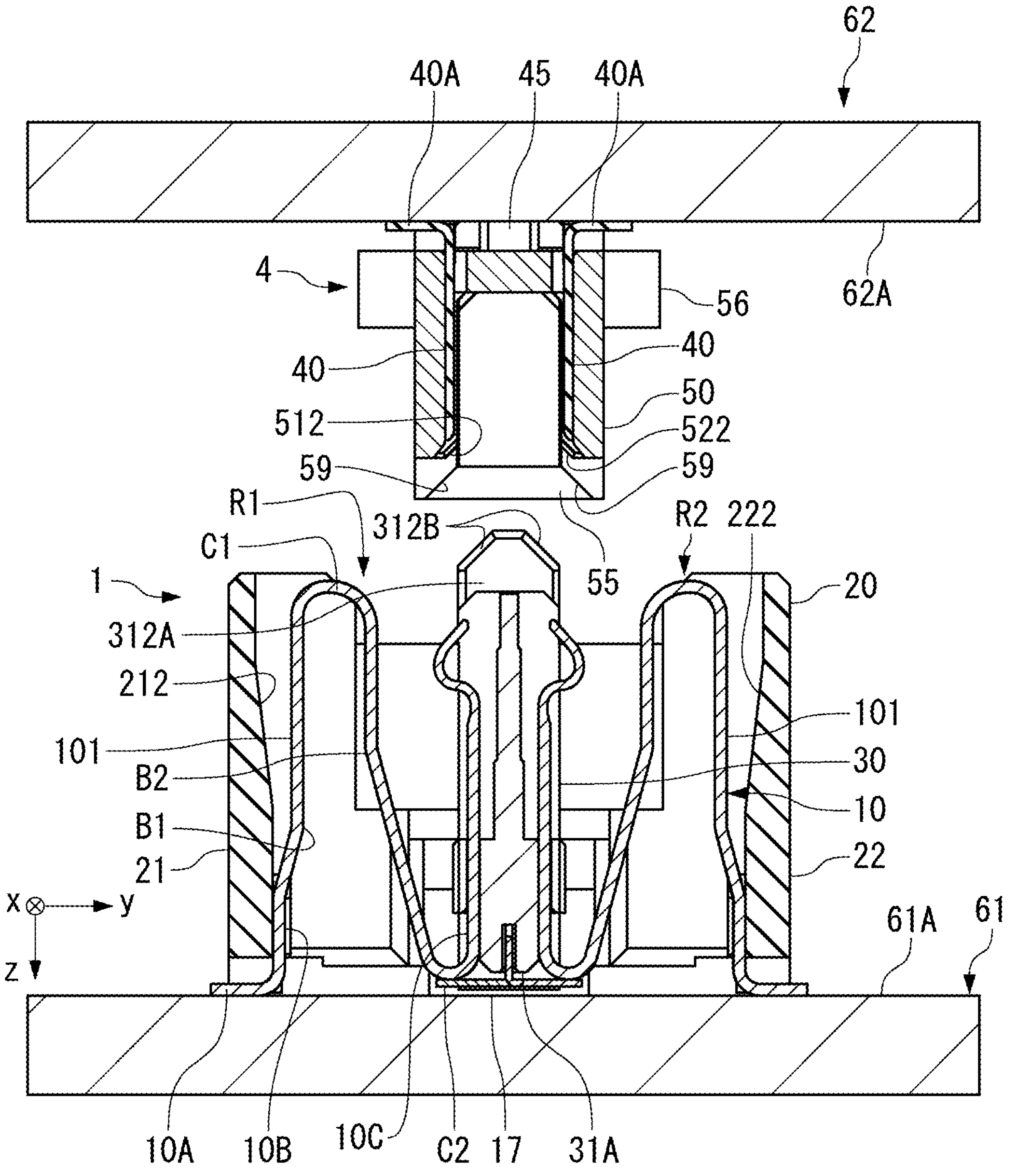
FIG. 13 is a cross sectional view illustrating the first connector and the second connector prior to mating.

In a case in which a structure including the first circuit board 61 and the first connector 1, and a structure including the second circuit board 62 and the second connector 4 are assembled, coincidence of the positions of the first connector 1 and the second connector 4 in the second direction y as illustrated in FIG. 13 is not necessarily ensured due to the accumulated tolerance of the tolerances of the dimensions and shapes of the elements, working, and assembly, and the like. However, it is possible to mate the first connector 1 and the second connector 4 with each other to obtain the connector assembly 100, and to assemble the first circuit board 61 and the second circuit board 62, on the basis of the configuration of the first connector 1, even in a case in which the position of each of the first connector 1 and the second connector 4 deviates toward at least one of the first direction x and the second direction y.

The movable housing 30 is supported by the stationary housing 20 via the first contacts 10 in a state in which the movable housing 30, the stationary housing 20, and the first circuit board 61 are assembled. In other words, the movable housing 30 is supported to elastically deform the first contacts 10 in the first direction x and the second direction y to be able to displace the first contacts 10. In such a case, with regard to a direct relationship between the movable housing 30 and the stationary housing 20, the lower portions 322 of the movable housing 30 and the facing portions 251 of the stationary housing 20 face each other in the mating direction z, and the relative displacement between the movable housing 30 including the lower portions 322 and the stationary housing 20 including the facing portions 251 in the first direction x and the second direction y is possible within the floating ranges corresponding to the gaps G1 and G2 existing between the movable housing 30 and the stationary housing 20. Since the lower portions 322 are positioned between the facing portions 251 and the first circuit board 61 to fit the movable housing 30 and the stationary housing 20 to each other, the movable housing 30 and the stationary housing 20 are not restrained by fittings for fitting, or the like. A floating range can be sufficiently secured over all the gaps G1 and G2 because a hindrance to relative displacement between the movable housing 30 and the stationary housing 20 is not constituted by such fittings. Therefore, in accordance with the present embodiment, the first connector 1 and the connector assembly 100, in which a floating range can be increased to, for example, a degree of ±1 mm or more, can be provided.

Figure 14:
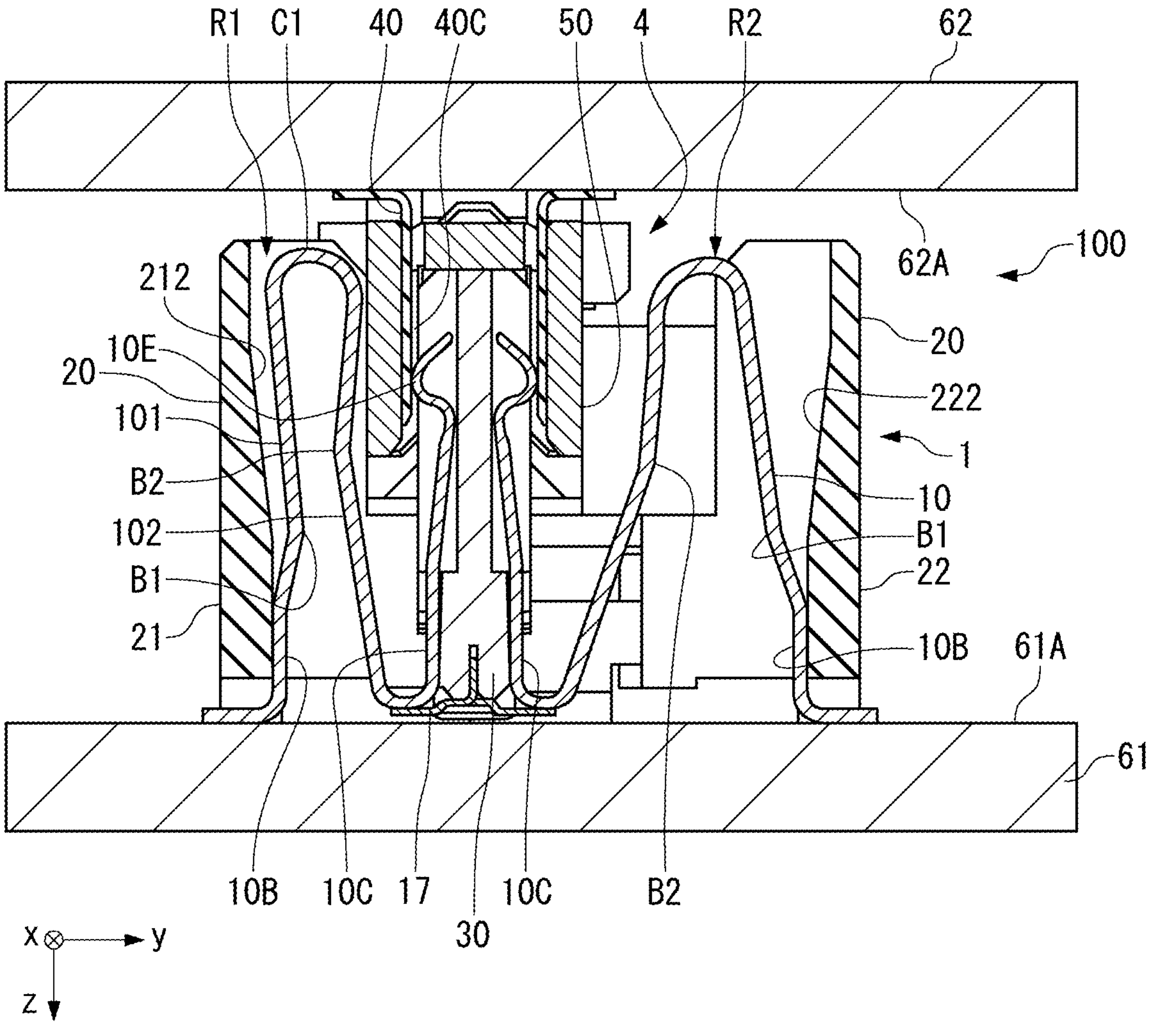
FIG. 14 is a cross sectional view illustrating a state in which connectors are elastically deformed in the first direction when the first connector and the second connector are mated with each other.

For example, in a case in which the first connector 1 and the second connector 4 in which positional deviation in the second direction y occurs are mated with each other, the movable housing 30 is displaced in the second direction y with respect to the stationary housing 20 while following the position of the housing 50 to allow the first contacts 10 to be elastically deformed in the second direction y, as illustrated in FIG. 14. In such a case, the first contacts 10 in one of the first row R1 and the second row R2 (the first row R1 in the example of FIG. 14) are deformed in a direction in which the fixation retention portions 10B and the movable retention portions 10C approach each other, and the first contacts 10 in the other (the second row R2 in the example of FIG. 14) are deformed in a direction in which the fixation retention portions 10B and the movable retention portions 10C move away from each other.

Contact between the sites of the first contacts 10 and contact between the first contacts 10 and the stationary housing 20 are avoided even in a case in which the elastic deformation volumes of the first contacts 10 are increased with an increase in floating range. The first bent portions B1 of the first sections 101 and the second bent portions B2 of the second sections 102 approach each other in the second direction y when the first contacts 10 are deformed in a direction in which the fixation retention portions 10B and the movable retention portions 10C approach each other, for example, as in the case of the first contacts 10 in the first row R1 illustrated in FIG. 14. However, the first bent portions B1 and the second bent portions B2 do not come into contact with each other because the positions of the first bent portions B1 and the second bent portions B2 in the mating direction z are different. Therefore, generation of excessive stress on the first contacts 10 due to a collision between the sites of the first contacts 10 can be avoided, and the deterioration of signal transmission characteristics due to the contact and conduction between the sites of the first contacts 10 can be avoided.

When the fixation retention portions 10B and the movable retention portions 10C approach each other at not less than a certain distance in the second direction y, the first sections 101 incline in the mating direction z, whereby parts, closer to the first bends C1, of the first sections 101 get closer to the side wall 21 of the stationary housing 20 than parts, closer to the fixation retention portions 10B, of the first sections 101. However, since the chamfer 212 having a shape following the direction of the slope of each first section 101 in such a case is formed on the inside of the side wall 21 of the stationary housing 20, the first sections 101 do not come into contact with the stationary housing 20. Thus, a state in which the first contacts 10, except predetermined sites such as the fixation retention portions 10B and the movable retention portions 10C, are apart from the housings 20 and 30 can be maintained. Accordingly, generation of excessive stress on the first contacts 10 due to a collision with the stationary housing 20 can be avoided, and the impedance match of a transmission path can be favorably maintained.

Positional deviation amounts corresponding to predetermined floating ranges in the first direction x, the second direction y, and the xy rotation direction, based on the first gaps G1 and the second gaps G2, are permitted in the first connector 1 and the second connector 4. When the first connector 1 and the second connector 4 are mated with each other, the movable housing 30 is guided in the second direction y by the action between the slopes 321B of the guide projections 321 and the second guiding slopes 59 of the housing 50, whereby the general position of the movable housing 30 in the second direction y is determined, and then, the movable housing 30 is located in the second direction y with respect to the housing 50 by the action between the guiding slopes 31C and the guiding slopes 512 and 522. Therefore, the movable housing 30 and the housing 50 can be smoothly mated with each other.

Figure 15:
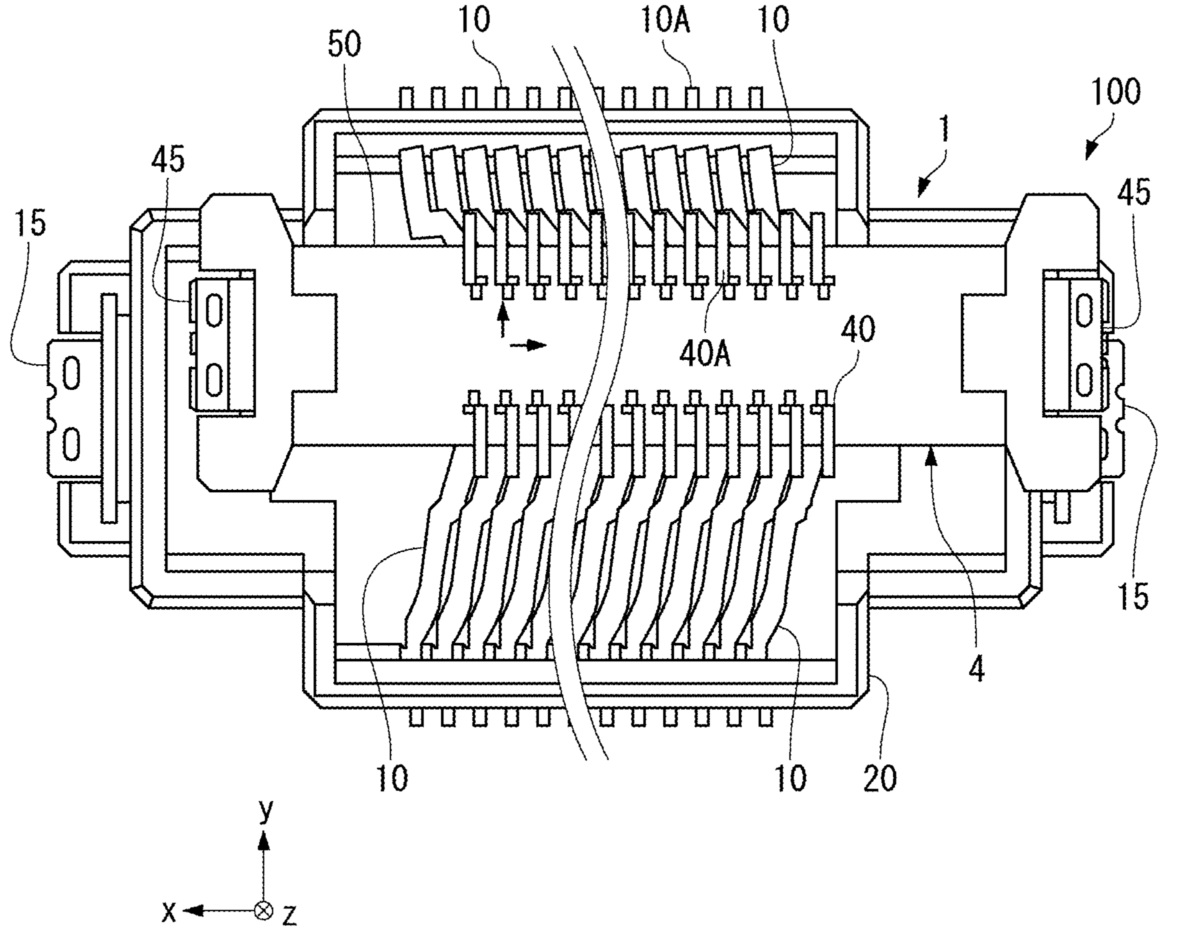
FIG. 15 is a top view illustrating a state in which contacts are elastically deformed in the first direction and the second direction when the first connector and the second connector are mated with each other.

FIG. 15 illustrates a state in which positional deviation between the first connector 1 and the second connector 4 occurs in both the first direction x and the second direction y. Even in such a case, the movable housing 30 is displaced with respect to the stationary housing 20 and the housing 50 by the action between the guiding slopes 31C and the guiding slopes 512 and 522 following the action between the guiding slopes 55 and 59, and the slopes 321A and 321B of the guide projections 321, within a floating range. Thus, each first contact 10 is elastically deformed in the first direction x and the second direction y.

In addition to the above, the configurations described in the embodiment described above can be chosen, or can be changed to other configurations as appropriate, without departing from the gist of the invention. An object to be bonded, to which the first contacts 10 are bonded, is not necessarily limited to a circuit board. Likewise, an object to which the second contacts 40 are bonded is not necessarily limited to a circuit board. The facing portions 251 that are formed on the stationary housing 20, and a part of the movable housing 30 that is positioned between the facing portions 251 and a reference surface (first mounting surface 61A) of an object to be bonded are not limited to the embodiment described above, and can be configured as appropriate. Not only the first gaps G1 are set between the facing portions 251 and the recesses 323 as in the case of the embodiment described, but also the first gaps G1 may be set between the movable housing 30 and the stationary housing 20 at positions apart from the facing portions 251 and the recesses 323. Likewise, not only the second gaps G2 are set between the side walls 322A and 322B of the expanded regions 32, and the side walls 252A and 252B of the expansion walls 25 as in the case of the embodiment described above, but also the second gaps G2 may be set between the movable housing 30 and the stationary housing 20 at positions apart from the expanded regions 32 and the expansion walls 25.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector, comprising:

a plurality of contacts arranged along a predetermined first direction to form a first row and a second row in parallel, positioned on a reference surface encompassing the first direction and a second direction orthogonal to the first direction, and bonded to an object to be bonded;

a stationary housing surrounding the plurality of contacts and positioned on the reference surface;

a movable housing that sections an interior of the stationary housing into an area closer to the first row and an area closer to the second row, and is displaceable in the first direction and the second direction with respect to the stationary housing, wherein each of the contacts comprises a fixation retention portion that is retained by the stationary housing, and a movable retention portion that is retained by the movable housing, and a first bend and a second bend are formed between the fixation retention portion and the movable retention portion; and a ground contact connection element that contacts with ground contact groups corresponding to some of the contacts in the first row and some of the contacts in the second row.

2. The connector according to claim 1, wherein the contacts are retained by the stationary housing and the movable housing.

3. The connector according to claim 2, wherein the stationary housing includes facing portions positioned to face the reference surface in the interior of the stationary housing.

4. The connector according to claim 3, wherein portions of the movable housing are positioned between the facing portions and the reference surface.

5. The connector according to claim 4, wherein the facing portions are formed each of two sides of the stationary housing in the first direction.

6. The connector according to claim 5, wherein first gaps exist between the movable housing and the facing portions in the first direction.

7. The connector according to claim 6, wherein regions that are positioned on both sides of the stationary housing in the second direction, and include second gaps between the movable housing and the stationary housing in the second direction, are formed in the stationary housing.

8. The connector according to claim 7, wherein the facing portions extend in the first direction and the second direction have a plate shape.

9. The connector according to claim 8, wherein recesses that are dented at positions of the facing portions in the first direction and can receive the facing portions are formed in the movable housing.

10. The connector according to claim 9, wherein the regions extend in the first direction and a mating direction in which the movable housing is mated with a mating connector, in an area closer to the reference surface than the facing portions, and on both the sides of the stationary housing in the first direction.

11. The connector according to claim 1, wherein each of the contacts includes a fixation retention portion retained by the stationary housing, and a movable retention portion retained by the movable housing.

12. The connector according to claim 11, wherein a first bend and a second bend are formed between the fixation retention portion and the movable retention portion.

13. The connector according to claim 12, wherein each of the contacts comprises:

a first section extending from the fixation retention portion to the first bend toward a side opposite to the reference surface;

a second section extending from the first bend toward the reference surface, and is contiguous to the movable retention portion via the second bend; and a third section extending from the movable retention portion to a terminating end that is connected to a contact of a mating connector with which the movable housing is mated, toward the side opposite to the reference surface.

14. The connector according to claim 13, wherein:

a first bent portion formed to have a shape convex toward the second section is formed on the first section; and in the second section, a second bent portion formed to have a shape convex toward the first section is formed at a position farther from the reference surface than a position of the first bent portion in a mating direction in which the movable housing and the mating connector are mated with each other.

15. The connector according to claim 1, wherein the ground contact connection element is disposed on a portion, facing the reference surface, of the movable housing along the first direction, and comprises a plurality of contact portions that come into contact with the second bends of the contacts included in the ground contact groups.

16. A connector assembly, comprising:

a first connector, including:

a plurality of contacts arranged along a predetermined first direction to form a first row and a second row in parallel, positioned on a reference surface encompassing the first direction and a second direction orthogonal to the first direction, and bonded to an object to be bonded;

a stationary housing surrounding the plurality of contacts and positioned on the reference surface, each of the contacts includes a fixation retention portion retained by the stationary housing, and a movable retention portion retained by the movable housing, wherein a first bend and a second bend are formed between the fixation retention portion and the movable retention portion; and a movable housing that sections an interior of the stationary housing into an area closer to the first row and an area closer to the second row, and is displaceable in the first direction and the second direction with respect to the stationary housing; and a second connector mated with the movable housing of the first connector, wherein:

each of the contacts comprises:

a first section extending from the fixation retention portion to the first bend toward a side opposite to the reference surface;

a second section extending from the first bend toward the reference surface, and is contiguous to the movable retention portion via the second bend; and a third section extending from the movable retention portion to a terminating end that is connected to a contact of a mating connector with which the movable housing is mated, toward the side opposite to the reference surface; and wherein:

a first bent portion formed to have a shape convex toward the second section is formed on the first section; and in the second section, a second bent portion formed to have a shape convex toward the first section is formed at a position farther from the reference surface than a position of the first bent portion in a mating direction in which the movable housing and the mating connector are mated with each other.

17. The connector assembly according to claim 16, wherein a chamfer separated in the second direction with respect to the first section with approaching from the fixation retention portion toward the first bend is formed on an inner wall of the stationary housing.

18. A connector, comprising:

a plurality of contacts arranged to form a first row and a second row in parallel, and bonded to an object;

a stationary housing surrounding the plurality of contacts;

a movable housing that sections an interior of the stationary housing into an area closer to the first row and an area closer to the second row, and is displaceable in a first direction and a second direction with respect to the stationary housing, each of the plurality of contacts includes a fixation retention portion that is retained by the stationary housing, and a movable retention portion that is retained by the movable housing; and a ground contact connection element contacting ground contact groups corresponding to a portion of the contacts in the first row and a portion of the contacts in the second row.

19. The connector according to claim 18, wherein each of the contacts further comprises:

a first section extending from the fixation retention portion to the first bend toward a side opposite to the reference surface;

a second section extending from the first bend toward the reference surface, and is contiguous to the movable retention portion via the second bend; and a third section extending from the movable retention portion to a terminating end that is connected to a contact of a mating connector with which the movable housing is mated, toward the side opposite to the reference surface.

20. The connector according to claim 19, wherein a first bent portion formed to have a shape convex toward the second section is formed on the first section.

* * * * *